(12) United States Patent
Song et al.

(10) Patent No.: US 12,087,981 B2
(45) Date of Patent: Sep. 10, 2024

(54) ELECTROLYTE HEALTH MANAGEMENT FOR REDOX FLOW BATTERY

(71) Applicant: ESS TECH, INC., Wilsonville, OR (US)

(72) Inventors: Yang Song, West Linn, OR (US); Timothy J. McDonald, Portland, OR (US); Alexandria Behr, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 0 days.

(21) Appl. No.: 18/361,626

(22) Filed: Jul. 28, 2023

(65) Prior Publication Data
US 2023/0378505 A1 Nov. 23, 2023

Related U.S. Application Data

(60) Division of application No. 17/453,993, filed on Nov. 8, 2021, now Pat. No. 11,764,380, which is a continuation of application No. 16/684,429, filed on Nov. 14, 2019, now Pat. No. 11,201,343.

(60) Provisional application No. 62/770,027, filed on Nov. 20, 2018.

(51) Int. Cl.
H01M 8/06 (2016.01)
H01M 8/04186 (2016.01)
H01M 8/0444 (2016.01)
H01M 8/04746 (2016.01)
H01M 8/18 (2006.01)

(52) U.S. Cl.
CPC ..... *H01M 8/0693* (2013.01); *H01M 8/04186* (2013.01); *H01M 8/0444* (2013.01); *H01M 8/04753* (2013.01); *H01M 8/188* (2013.01)

(58) Field of Classification Search
CPC .......... H01M 8/0693; H01M 8/04186; H01M 8/0444; H01M 8/04753; H01M 8/188
See application file for complete search history.

(56) References Cited

U.S. PATENT DOCUMENTS

| 4,159,366 | A  | 6/1979  | Thaller       |
| 9,509,011 | B2 | 11/2016 | Evans et al.  |
| 9,543,609 | B2 | 1/2017  | Amstutz et al.|
| 9,806,366 | B2 | 10/2017 | Song et al.   |
| 10,230,125| B2 | 3/2019  | Evans et al.  |
| 10,615,442| B2 | 4/2020  | Song et al.   |

(Continued)

FOREIGN PATENT DOCUMENTS

| CN | 113314733 A | 8/2021 |
| EP | 4016681 A1  | 6/2022 |

(Continued)

OTHER PUBLICATIONS

Japanese Patent Office, Office Action Issued in Application No. 2021-528344, Oct. 17, 2023, 9 pages.

(Continued)

*Primary Examiner* — Amanda C. Walke
(74) *Attorney, Agent, or Firm* — McCoy Russell LLP

(57) ABSTRACT

Methods and systems are provided for a rebalancing reactor of a flow battery system. In one example, a pH of a battery electrolyte may be maintained by the rebalancing reactor by applying a negative potential to a catalyst bed of the rebalancing reactor. A performance of the rebalancing reactor may further be maintained by treating the catalyst bed with deionized water.

15 Claims, 12 Drawing Sheets

(56) References Cited

U.S. PATENT DOCUMENTS

| | | |
|---|---|---|
| 10,777,836 B1 | 9/2020 | Wei et al. |
| 2011/0086247 A1 | 4/2011 | Keshavarz et al. |
| 2013/0084482 A1 | 4/2013 | Chang et al. |
| 2014/0131217 A1 | 5/2014 | Buschmann |
| 2014/0272483 A1 | 9/2014 | Pham et al. |
| 2014/0363747 A1 | 12/2014 | Evans et al. |
| 2015/0104724 A1 | 4/2015 | Chang et al. |
| 2015/0155586 A1 | 6/2015 | Pham et al. |
| 2015/0255824 A1 | 9/2015 | Evans et al. |
| 2016/0293992 A1 | 10/2016 | Song et al. |
| 2018/0294502 A1 | 10/2018 | Selverston et al. |
| 2018/0316033 A1 | 11/2018 | Evans |
| 2021/0344030 A1 | 11/2021 | Selverston et al. |
| 2022/0134292 A1 | 5/2022 | Liu et al. |
| 2022/0200030 A1 | 6/2022 | Liu et al. |
| 2022/0200035 A1 | 6/2022 | Kender |
| 2022/0209274 A1 | 6/2022 | Nicholls et al. |

FOREIGN PATENT DOCUMENTS

| | | |
|---|---|---|
| JP | S54162130 A | 12/1979 |
| JP | S60070672 A | 4/1985 |
| JP | H06260204 A | 9/1994 |
| JP | H0821415 A | 1/1996 |
| JP | H1012466 A | 1/1998 |
| JP | 2018536968 A | 12/2018 |
| KR | 20170020178 A | 2/2017 |
| WO | 2017062936 A1 | 4/2017 |
| WO | 2018201093 A1 | 11/2018 |

OTHER PUBLICATIONS

Selverston, S. et al., "In-tank hydrogen-ferric ion recombination," Journal of Power Sources, vol. 324, Aug. 30, 2016, 5 pages.

ISA Korean Intellectual Property Office, International Search Report and Written Opinion Issued in Application No. PCT/US2019/061550, Mar. 12, 2020, WIPO, 9 pages.

European Patent Office, Extended European Search Report Issued in Application No. 19886973.7, Apr. 8, 2022, Germany, 6 pages.

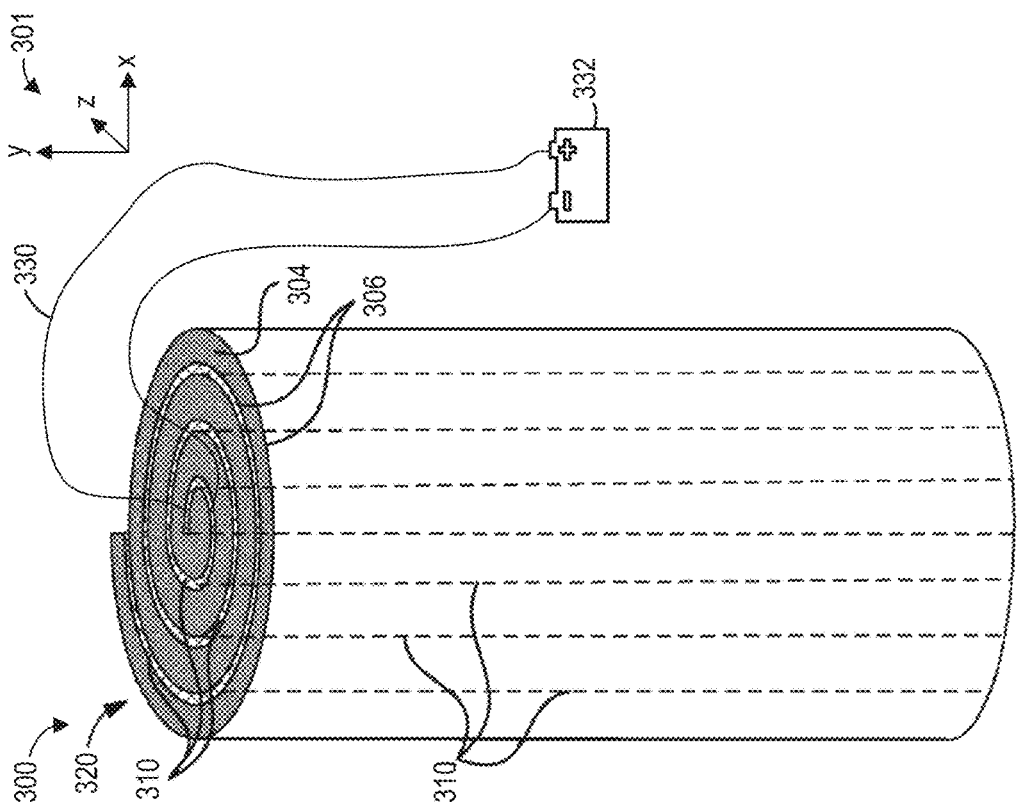
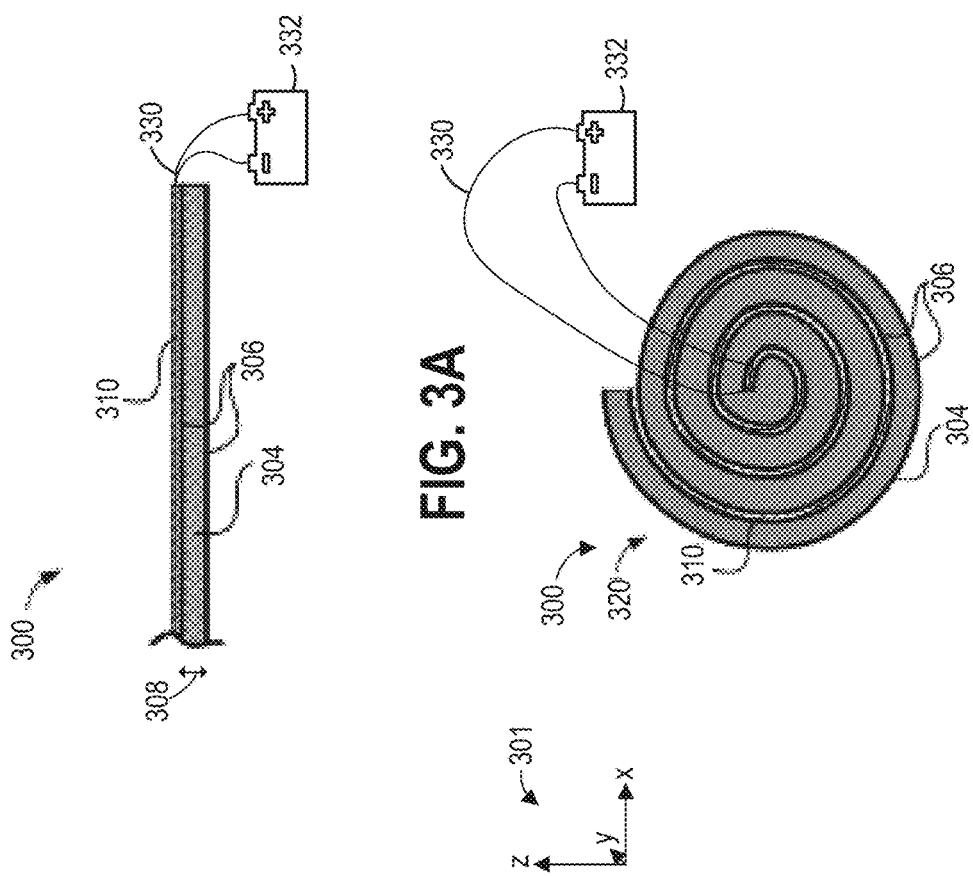
FIG. 3A
FIG. 3B
FIG. 3C

ELECTROLYTE HEALTH MANAGEMENT FOR REDOX FLOW BATTERY

CROSS REFERENCE TO RELATED APPLICATIONS

The present application is a Divisional of U.S. patent application Ser. No. 17/453,993, entitled "ELECTROLYTE HEALTH MANAGEMENT FOR REDOX FLOW BATTERY", filed on Nov. 8, 2021, which is a continuation of U.S. patent application Ser. No. 16/684,429, entitled "ELECTROLYTE HEALTH MANAGEMENT FOR REDOX FLOW BATTERY", filed on Nov. 14, 2019. The U.S. patent application Ser. No. 16/684,429 claims priority to U.S. Provisional Patent Application No. 62/770,027, entitled "ELECTROLYTE HEALTH MANAGEMENT FOR REDOX FLOW BATTERY", filed on Nov. 20, 2018. The entire contents of the above-listed applications are hereby incorporated by reference for all purposes.

FIELD

The present description relates generally to a system for operating a redox flow battery system.

BACKGROUND AND SUMMARY

Performance degradation is a significant obstacle in battery systems, arising from a number of factors including, for example, side reactions at the positive or negative electrode, internal shorting, ionic movement, and catalyst poisoning. In a hybrid flow battery, such as an iron redox flow battery, undesirable reactions occurring in battery electrolyte may lead to capacity degradation, resulting in costly compensation. For example, generation of hydrogen gas as well as iron corrosion by proton ($H^+$) and ferric ($Fe^{3+}$) ions at the negative electrode may drive an electrolyte charge imbalance, thereby reducing battery capacity. Furthermore, at least one side reaction described above may result in hydrogen evolution while iron corrosion occurring at the negative electrode may cause electrolyte instability, further reducing a useful lifetime of a battery.

In order to maintain a performance of the battery, the electrolyte state of charge (SOC) may be rebalanced by a supporting electrochemical reaction occurring at an auxiliary rebalancing reactor. In one example, hydrogen gas produced at the negative electrode may be directed to a catalyst and contact between the hydrogen gas and the catalyst surface may chemically oxidize the hydrogen gas, returning protons to the electrolyte. A low electrolyte pH for sustaining electrolyte stability may be maintained as well as the balance of the electrolyte SOC.

However, the inventors herein have recognized potential issues with such systems. As one example, a presence of anions in the electrolyte may interact with the catalyst in a manner that degrades catalyst performance. The anions may adsorb onto the catalyst surface to form an anionic complex that induces formation of a cationic diffusion double layer. The positive double layer inhibits electro-active species from reaching reaction sites on the catalyst, thus poisoning the catalyst and reducing an efficiency of the rebalancing reactor.

In one example, the issues described above may be addressed by a method for treating a rebalancing reactor of a flow battery including flowing an electrolyte of the flow battery and hydrogen gas generated in the flow battery to the rebalancing reactor, applying a negative potential to a catalyst bed of the rebalancing reactor while charging the flow battery, detecting a decrease in a ferric iron reduction rate at the rebalancing reactor below a threshold rate, halting flow of electrolyte and hydrogen gas to the rebalancing reactor and then flowing deionized water through the rebalancing reactor in response to the decrease in the ferric iron reduction, and indicating, after a threshold interval of operating time elapses, a request for soaking of the catalyst bed in deionized water. In this way, a likelihood of catalyst degradation is reduced and a performance of the flow battery is maintained.

As one example, the catalyst may be soaked in water at elevated temperatures to remove anionic complexes from the surface of the catalyst in between operation of the rebalancing reactor. Fresh catalyst surface is exposed, enabling the catalyst to perform at a higher capacity. Additionally or alternatively, a negative potential may be applied to the catalyst surface during operation of the rebalancing reactor, thereby repelling anions and reducing a likelihood of anion adsorption onto the catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows an example of a catalyst bed which may be used in a rebalancing reactor, including sandwiched layers of a substrate, a catalyst, and a spacer.

FIG. 3B shows an end view of the catalyst bed rolled up into a jelly roll structure.

FIG. 3C shows a perspective side view of the catalyst bed rolled up into a jelly roll structure.

FIGS. 2-3C are shown approximately to scale.

DETAILED DESCRIPTION

Figure 1:
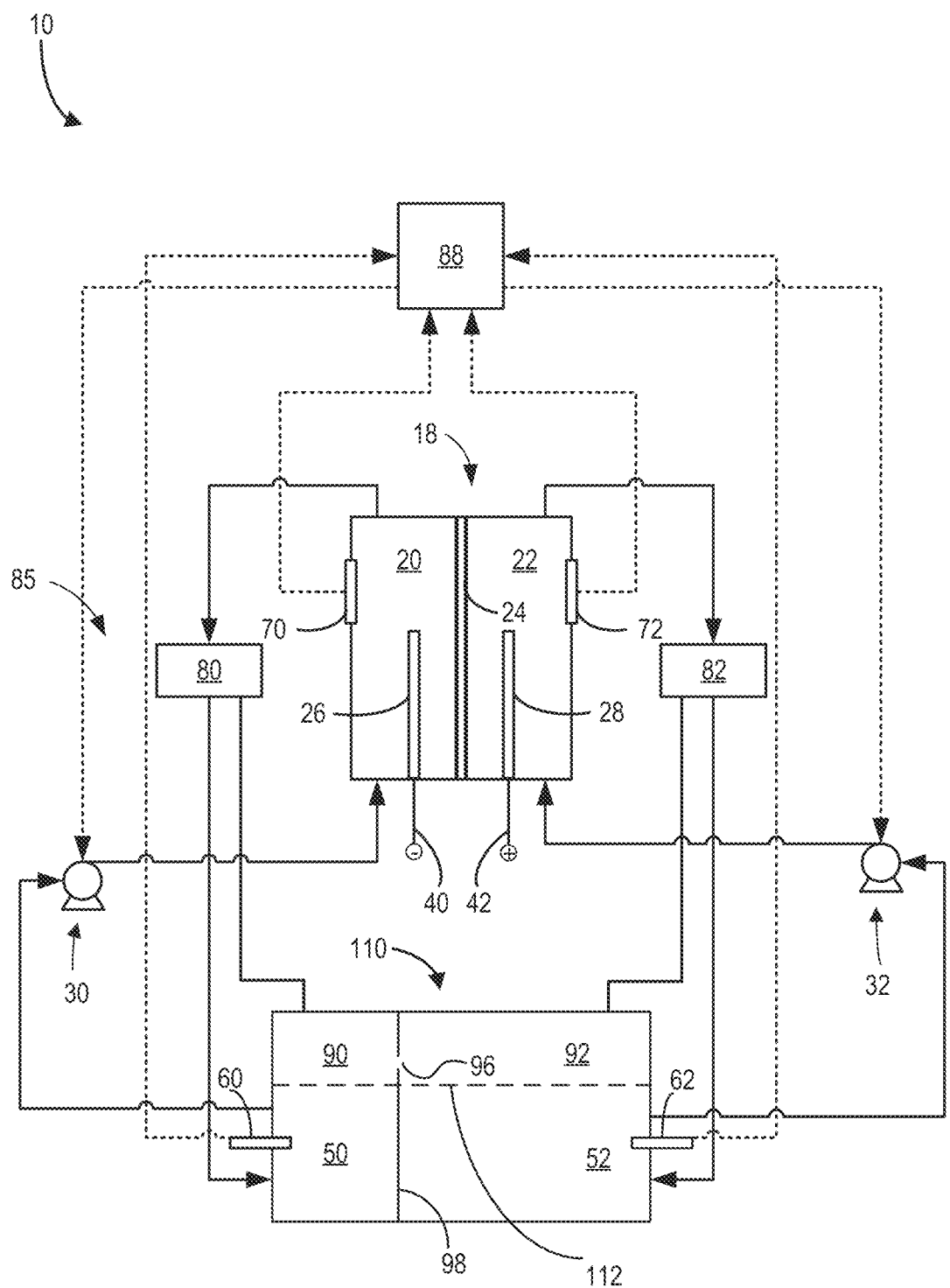
FIG. 1 shows a schematic example of a flow battery system.
Figure 5:
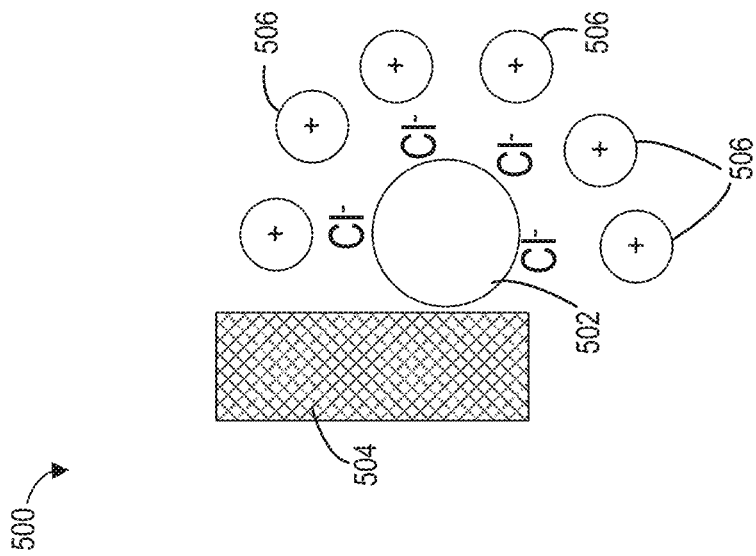
FIG. 5 shows a second example of a reaction process occurring at a rebalancing reactor catalyst.
Figure 8:
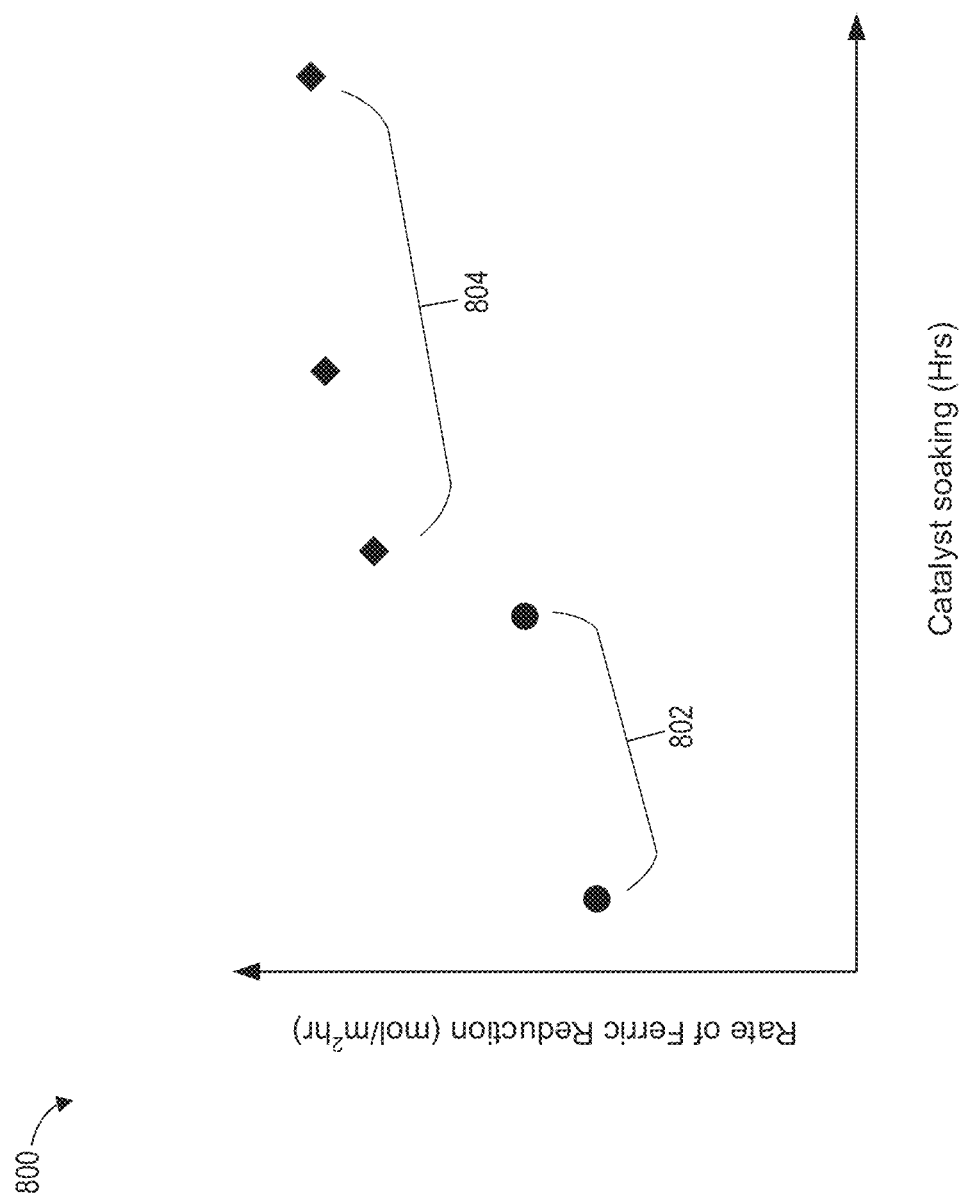
FIG. 8 shows a graph depicting datasets for a change in catalyst performance relative to a first variable of a first treatment process.
Figure 9:
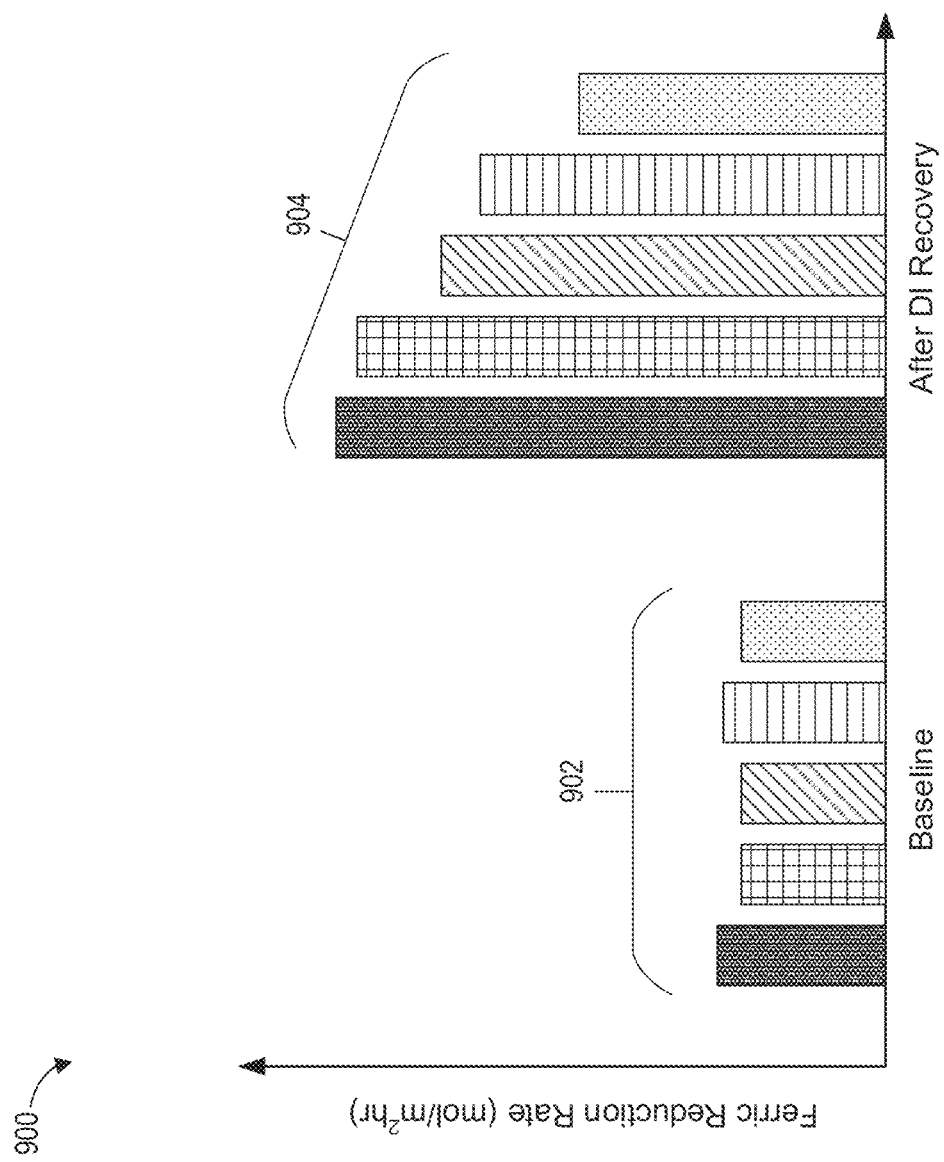
FIG. 9 shows a graph depicting datasets for a change in catalyst performance relative to a second variable of the first treatment process.
Figure 11:
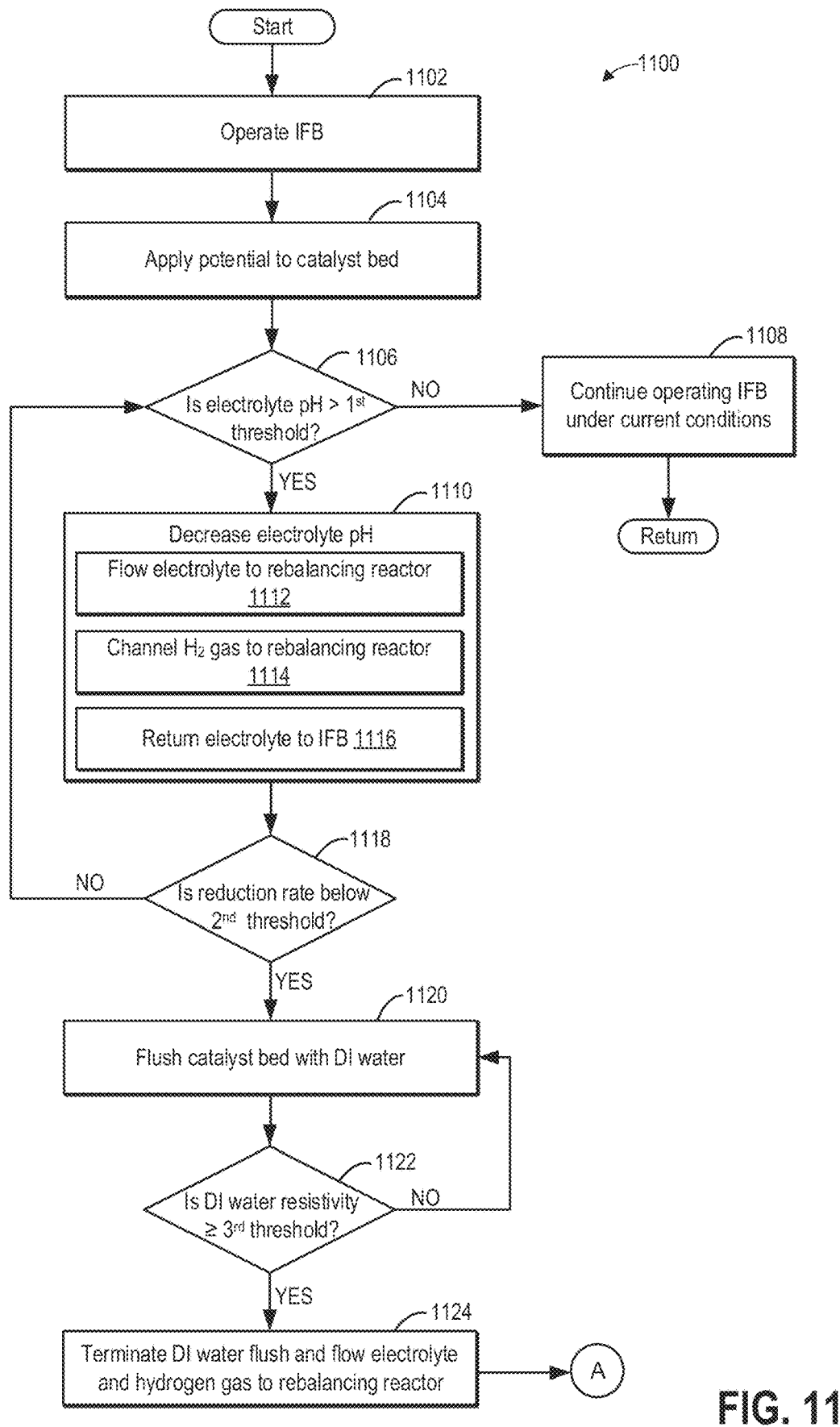
FIG. 11 shows an example of a method for maintaining catalyst performance in the rebalancing reactor by using a combination of the first and second treatment processes.
Figure 12:
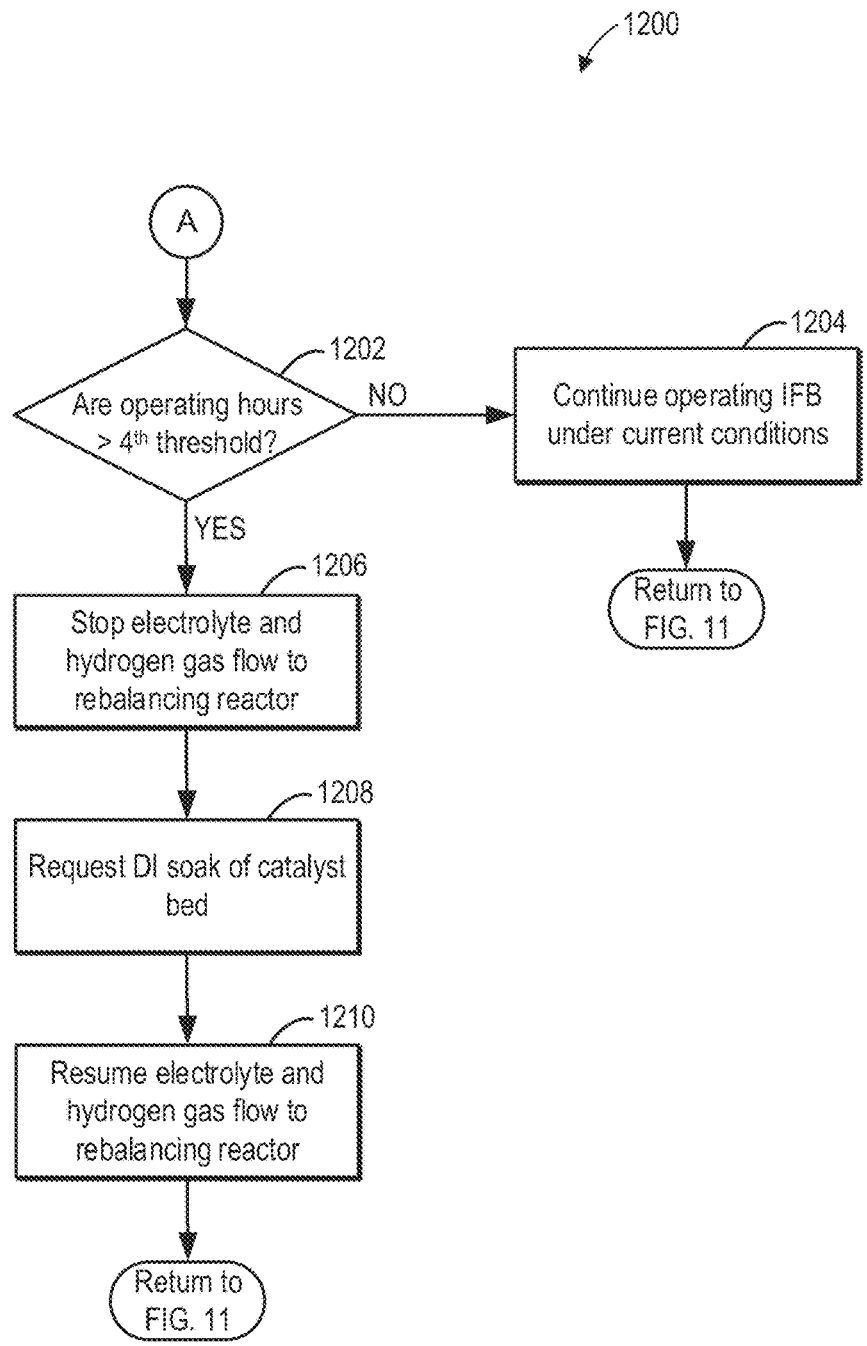
FIG. 12 is a continuation of the method of FIG. 11.
Figure 13:
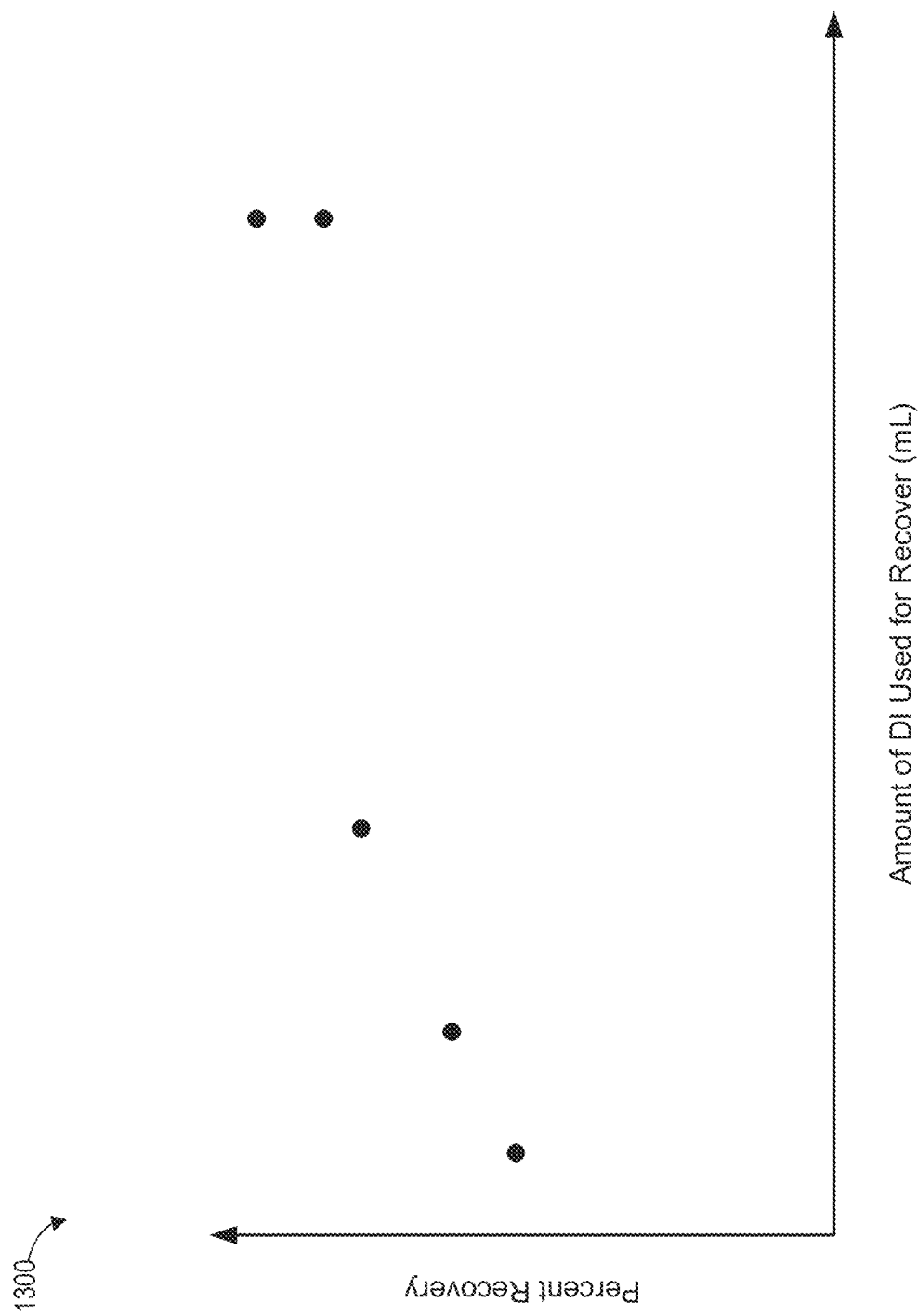
FIG. 13 shows a graph depicting percent recovery of a catalyst bed versus an amount of deionized water used to soak the catalyst bed.

The following description relates to systems and methods for a rebalancing reactor for a redox flow battery. The redox flow battery may be an all-iron flow battery (IFB) relying on iron redox reactions to drive a flow of electrons. An example of a redox flow battery system, which may include the IFB, is shown in a schematic diagram in FIG. 1, illustrating a plurality of battery components and an arrangement of the plurality of battery components in the IFB system. The plurality of system components may include a rebalancing reactor to maintain a pH and state of electrolyte charge in the IFB. For both a negative and a positive electrolyte of the IFB, the rebalancing reactor may be configured to oxidize hydrogen gas at a catalyst surface, the hydrogen gas generated by a side reaction at a negative electrode of the IFB, as shown in a schematic representation in FIG. 2. The catalyst may be incorporated in a catalyst bed, forming a layer sandwiched between a substrate and a spacer, as shown in FIG. 3A. The catalyst bed may be rolled up into a jelly roll structure to increase a packing density of the catalyst, the jelly roll arranging the catalyst in a spiral configuration as shown in FIGS. 3B-3C. Hydrogen oxidation may be facilitated at the catalyst surface on a carbon substrate of the rebalancing reactor, shown in a first reaction scheme which may occur in the rebalancing reactor in FIG. 4. However, the hydrogen oxidation reaction may be impeded by formation of an anionic layer at the catalytic reaction sites of the carbon substrate, as shown in FIG. 5 in a second reaction scheme which may occur at the carbon electrode. An overall concentration of ions in the electrolyte may degrade a performance of the rebalancing reactor due the process shown in FIG. 5. An effect of ionic concentration on a rate of iron reduction facilitated by the catalyst of the rebalancing reactor is plotted in FIG. 6. By treating the catalyst and a catalyst bed, the performance of the rebalancing reactor may be improved. A first and a second treatment process for the catalyst bed may be evaluated in a testing apparatus depicted in a schematic diagram in FIG. 7. A deterioration in catalytic performance may be mitigated by a first treatment process that includes soaking the catalyst bed in water. Results of different catalyst bed soaking times is shown in FIG. 8 in a graph plotting a rate of iron reduction in the rebalancing reactor with soaking time. A volume of water used to the soak the catalyst bed may also affect catalyst performance, as shown in a graph in FIG. 9 comparing an effect of water volume on different types of catalysts. Degradation of catalyst durability may also be addressed by a second treatment process which may include applying a potential to the catalyst bed (e.g., the catalyst supported on a substrate) during operation of the rebalancing system. A rate of iron reduction at the catalyst bed with an applied potential is compared to a baseline rate of iron reduction in a graph depicted in FIG. 10. Methods for maintaining the catalytic performance of the rebalancing reactor is shown in FIGS. 11-12. A method shown in FIG. 11 is continued in FIG. 12, the method incorporating a combination of three techniques, including applying a negative potential to the catalyst bed, flushing the catalyst bed with DI water, and soaking the catalyst bed in DI water to prolong a desired catalytic activity of the rebalancing reactor. An effect of a volume of DI water used to soak a degraded catalyst bed is shown in FIG. 13 relative to a percent recovery of catalyst performance.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Hybrid redox flow batteries are redox flow batteries that are characterized by deposition of one or more electro-active materials as a solid layer on an electrode. Hybrid redox flow batteries may, for instance, include a chemical that plates via an electrochemical reaction as a solid onto a substrate throughout a battery charge process. During battery discharge, the plated species may ionize also via an electrochemical reaction, becoming soluble in the electrolyte. In hybrid battery systems, a charge capacity (e.g., amount of energy stored) of the redox battery may be limited by an amount of metal plated during battery charge and may depend on an efficiency of the plating system as well as an available volume and surface area available for plating.

In a redox flow battery system a negative electrode, such as a negative electrode 26 of FIG. 1, may be referred to as a plating electrode and a positive electrode, such as a positive electrode 28 of FIG. 1, may be referred to as a redox electrode. A negative electrolyte within a plating side (e.g., negative electrode compartment 20 of FIG. 1) of the battery may be referred to as a plating electrolyte and a positive electrolyte on a redox side (e.g. positive electrode compartment 22 of FIG. 1) of the battery may be referred to as a redox electrolyte.

Anode refers to an electrode where electro-active material loses electrons and cathode refers to an electrode where electro-active material gains electrons. During battery charge, the positive electrolyte gains electrons at the negative electrode; therefore the negative electrode is the cathode of the electrochemical reaction. During discharge, the positive electrolyte loses electrons; therefore the negative electrode is the anode of the reaction. Accordingly, during charge, the negative electrolyte and negative electrode may be respectively referred to as a catholyte and cathode of the electrochemical reaction, while the positive electrolyte and the positive electrode may be respectively referred to as an anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all-iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal onto the negative electrode during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

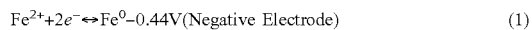

$$Fe^{2+}+2e^- \leftrightarrow Fe^0 -0.44V \text{(Negative Electrode)} \quad (1)$$

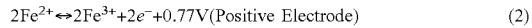

$$2Fe^{2+} \leftrightarrow 2Fe^{3+}+2e^- +0.77V \text{(Positive Electrode)} \quad (2)$$

As discussed above, the negative electrolyte used in the all-iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and dissolving back into the electrolyte. The equilibrium potential of the above reaction is $-0.44V$ and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is $+0.77V$, creating a positive terminal for the desired system.

The IFB provides the ability to charge and recharge its electrolytes in contrast to other battery types utilizing non-regenerating electrolytes. Charge is achieved by applying a current across the electrodes via terminals, such as a negative terminal 40 and a positive terminal 42 in FIG. 1. The negative electrode may be coupled via the negative terminal to a negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22 in FIG. 1). The electrons provided to the negative electrode (e.g., plating electrode) may reduce the $Fe^{2+}$ in the negative electrolyte to form $Fe^0$ at the plating substrate causing it to plate onto the negative electrode.

Discharge may be sustained while $Fe^0$ remains available to the negative electrolyte for oxidation and while $Fe^{3+}$ remains available in the positive electrolyte for reduction. As an example, $Fe^{3+}$ availability may be maintained by increasing a concentration or a volume of the positive electrolyte to the positive electrode compartment side of an IFB cell, such as cell 18 of FIG. 1, to provide additional $Fe^{3+}$ ions via an external source, such as an external positive electrolyte chamber or positive electrolyte chamber. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment. As an example, $Fe^{2+}$ availability can be maintained by providing additional $Fe^{2+}$ ions via an external source, such as an external negative electrolyte chamber to increase the concentration or the volume of the negative electrolyte to the negative electrode compartment side of the IFB cell.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which may reduce electrolyte cross-contamination and may increase the efficiency of the IFB system, resulting in less electrolyte replacement as compared to other redox flow battery systems.

Efficiency losses in an IFB may result from electrolyte crossover through a separator, e.g., a separator 24 of FIG. 1, (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment may result in coulombic efficiency losses. Ferric ions crossing over from the low pH redox side (e.g., more acidic positive electrode compartment) to the high pH plating side (e.g., less acidic negative electrode compartment) can result in precipitation of $Fe(OH)_3$. Precipitation of $Fe(OH)_3$ may degrade the separator and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas), and the reaction of protons in the negative electrode compartment with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and may be produced at low costs. The IFB electrolyte offers higher reclamation value because the same electrolyte may be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

During charge of an IFB, for example, ferrous ion, $Fe^{2+}$, is reduced (accepts two electrons in a redox reaction) to metal iron, $Fe^0$, at the negative electrode. Simultaneously, at the positive electrode, ferrous ion, $Fe^{2+}$, is oxidized (loss of an electron) to ferric ion, $Fe^{3+}$. Concurrently, at the negative electrode, the ferrous iron reduction reaction competes with the reduction of protons, $H^+$, wherein two protons each accept a single electron to form hydrogen gas, $H_2$ and the corrosion of iron metal to produce ferrous ion, $Fe^{2+}$. The production of hydrogen gas through reduction of hydrogen protons and the corrosion of iron metal are shown in equations (3) and (4), respectively:

$$H^+ + e^- \leftrightarrow \frac{1}{2}H_2 \quad \text{(proton reduction)} \tag{3}$$

$$Fe^0 + 2H^+ \leftrightarrow Fe^{2+} + H_2 \quad \text{(iron corrosion)} \tag{4}$$

As a result, the negative electrolyte in the negative electrode compartment tends to stabilize at a pH range between 3 and 6. At the positive electrode compartment, ferric ion, $Fe^{3+}$, has a much lower acid disassociation constant (pKa) than that of ferrous ion, $Fe^{2+}$. Therefore, as more ferrous ions are oxidized to ferric ions, the positive electrolyte tends to stabilize at a pH less than 2, in particular at a pH closer to 1.

Accordingly, maintaining the positive electrolyte pH in a first range in which the positive electrolyte (in the positive electrode compartment) remains stable and maintaining the negative electrolyte pH in a second range in which the negative electrolyte (in the negative electrode compartment) remains stable may reduce low cycling performance and increase efficiency of redox flow batteries. For example, maintaining a pH of a negative electrolyte in an IFB between 3 and 4 may reduce iron corrosion reactions and increase iron plating efficiency, while maintaining a pH of a positive electrolyte less than 2, and, in particular, less than 1, may promote the ferric/ferrous ion redox reaction and reduce ferric hydroxide formation.

As indicated by equation (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via equation (3), thereby reducing the electrons available for plating given by equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive electrode compartment and the negative electrode compartment can develop as a result of hydrogen production via reaction (3) and (4). Furthermore, hydrogen gas production resulting from iron metal corrosion and proton reduction both consume protons, which can result in a pH increase of the negative electrolyte. As discussed above, an increase in pH may destabilize the electrolyte in the redox battery flow system, resulting in further battery capacity and efficiency losses.

An approach that addresses the electrolyte rebalancing issues that may be caused by hydrogen gas production in redox flow battery systems comprises reducing the imbalanced ion in the positive electrolyte with hydrogen generated from the side reactions. As an example, in an IFB system, the positive electrolyte comprising ferric ion may be reduced by the hydrogen gas according to equation (5):

$$Fe^{3+} + \tfrac{1}{2}H_2 \rightarrow Fe^{2+} + H^+ \tag{5}$$

In the IFB system example, by reacting ferric ion with hydrogen gas, the hydrogen gas can be converted back to protons, thereby maintain a substantially constant pH in the negative electrode compartment and the positive electrode compartment. Furthermore, by converting ferric ion to ferrous ion, the state of charge of the positive electrolyte in the positive electrode compartment may be rebalanced with the state of charge of the negative electrolyte in the negative electrode compartment. Although equation (5) is written for rebalancing electrolytes in an IFB system, the method of reducing an electrolyte with hydrogen gas may be generalized by equation (6):

$$M^{x+} + \frac{(x-z)}{2}H_2 \rightarrow M^{z+} + (x-z)H^+ \tag{6}$$

In equation (6), $M^{x+}$ represents the positive electrolyte M having ionic charge, x, and $M^{z+}$ represents the reduced electrolyte M having ionic charge, z.

A catalyst comprising graphite or comprising supported precious metal (e.g., carbon-supported Pt, Rd, Ru, or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons).

Returning to FIG. 1, a schematic illustration of a generic redox flow battery system 10 is depicted. In some examples, the redox flow battery system 10 may be the IFB system described above. The redox flow battery system 10 may comprise the redox flow battery cell 18, fluidly connected to a multi-chambered electrolyte storage tank 110. The redox flow battery cell 18 may generally include the negative electrode compartment 20, the separator 24, and the positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise the negative electrode 26, and a negative electrolyte comprising electroactive materials. The positive electrode compartment 22 may comprise the positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include the negative battery terminal 40, and the positive battery terminal 42. When a charge current is applied to the battery terminals 40 and 42, the positive electrolyte is oxidized (e.g., loses one or more electrons) at the positive electrode 28, and the negative electrolyte is reduced (e.g., gains one or more electrons) at the negative electrode 26. During battery discharge, reverse redox reactions occur on the electrodes. In other words, the positive electrolyte is reduced (e.g., gains one or more electrons) at the positive electrode 28, and the negative electrolyte is oxidized (e.g., loses one or more electrons) at the negative electrode 26. The electrical potential difference across the battery is maintained by the electrochemical redox reactions in the positive electrode compartment 22 and the negative electrode compartment 20, and may induce a current through a conductor while the reactions are sustained. An amount of energy stored by a redox battery is limited by an amount of electro-active material available in electrolytes for discharge, depending on a total volume of electrolytes and a solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. FIG. 1 further illustrates the fill height 112 of storage tank 110, which may indicate the liquid level in each tank compartment.

FIG. 1 also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chambered electrolyte storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows a spill-over hole 96, which creates an opening in the bulkhead 98 between gas head spaces 90 and 92, and provides a means of equalizing gas pressure between the two chambers. The spill-over hole 96 may be positioned at a threshold height above the fill height 112. The spill-over hole 96 further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by a controller 88 to regulate a temperature of the negative electrolyte chamber 50 and the positive electrolyte chamber 52 independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62.

As examples, the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level.

Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, components of a rebalancing system 85 of the IFB, may be connected in-line or in parallel with the recirculating flow paths of the electrolyte at the negative and positive sides of the battery, respectively, in the redox flow battery system 10. The rebalancing system 85 may include one or more rebalancing reactors connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity.

In one example, the electrolyte rebalancing reactors 80 and 82 may be placed in the return flow path from the positive and negative electrode compartments 20 and 22 to the positive and negative electrolyte chambers 50 and 52, respectively. The rebalancing system 85 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. Alternatively, the rebalancing reactors 80 and 82 may have catalyst beds configured as a jelly roll, in shown in FIGS. 3A-3C and discussed further below. Furthermore, methods for maintaining an activity of the catalyst surfaces are provided further below with respect to FIGS. 7-13. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 may be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. In one example, sensors 70 and 72 may include pressure sensors that transmit signals to the controller 88 indicating the pressure at the negative and positive sides of the separator 24 of the redox flow battery cell 18. The pressure at the negative and positive electrode compartments 20 and 22 of the separator 24 may be regulated by controlling the inlet and outlet flows of negative and positive electrolyte thereto, respectively. For example, the controller may decrease a pressure at the negative electrode compartment 20 by one or more of increasing a pump speed of a vacuum pump fluidly coupled to thereto, reducing a pump speed of the negative electrolyte pump 30, and by throttling a back pressure flow regulator to increase an outlet flow from the negative electrode compartment.

Similarly, the controller may increase a pressure at the positive electrode compartment 22 by one or more of increasing a pump speed of the positive electrolyte pump 32, and by throttling a back pressure flow regulator to decrease an outlet flow from the negative electrode compartment. Back pressure flow regulators may include orifices, valves, and the like. For example, controller 88 may send a signal to position a valve to a more open position, to induce higher outlet flows from negative electrode compartment 20, thereby reducing a negative electrode compartment pressure. Increasing the positive electrode compartment pressure and decreasing the pressure in the negative electrode compartment may aid in increasing a cross-over pressure (positive over negative) across the separator 24. Increasing the cross-over pressure by increasing the flow of the positive electrolyte by increasing the pump speed of the positive electrolyte pump 32 and increasing back pressure at the outlet of the positive electrode compartment 22 may be less desirable than other methods of increasing the cross-over pressure because pump parasitic losses may be increased.

Sensors may be positioned at other locations throughout the redox flow battery system to monitor electrolyte chemical properties and other properties, such as temperature, fluid pressure, current, voltage etc. For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, pressure, conductivity, and level sensors of a field hydration system may transmit signals to the controller 88 when hydrating the redox flow battery system 10 in a dry state. Furthermore, controller 88 may send signals to actuators such as valves and pumps of the field hydration system during hydration of the redox flow battery system 10. Sensor information may be transmitted to controller 88 which may in turn actuate negative and positive electrolyte pumps 30 and 32 to control electrolyte flow through the cell 18, or to perform other control functions, as an example. In this manner, the controller 88 may be responsive to, one or a combination of sensors and probes. Redox flow battery cell 18 may be positioned within one of a plurality of redox flow battery cell stacks of a power module for a redox flow battery system. Each of the redox flow battery cells 18 in a redox flow battery cell stack may be electrically connected in series and/or parallel with a plurality of other redox flow battery cells in the redox flow battery cell stack. Furthermore, each of the redox flow battery cell stacks may be electrically connected in series and/or parallel with a plurality of the other redox flow battery cell stacks in the power module. In this way, the redox flow battery cell stacks may be electrically combined to supply power from the power module.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110.

The integrated multi-chambered electrolyte storage tank 110 may supplement the hydrogen gas generated in the redox flow battery system 10. For example, when gas leaks are detected in the redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH.

In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small. As described above, a rebalancing system, such as the rebalancing system 85 of FIG. 1, may include one or more rebalancing reactors, e.g., the rebalancing reactors 80 and 82 of FIG. 1, forming an electrochemical cell used to maintain the pH and stability of electrolytes for an IFB battery. Reactions occurring at the rebalancing reactors are described below by equations (7) and (8):

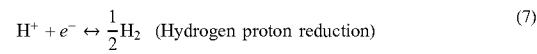
$$H^+ + e^- \leftrightarrow \frac{1}{2}H_2 \quad \text{(Hydrogen proton reduction)} \tag{7}$$

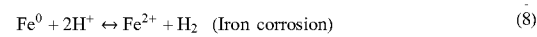
$$Fe^0 + 2H^+ \leftrightarrow Fe^{2+} + H_2 \quad \text{(Iron corrosion)} \tag{8}$$

The electrochemical cell may also be referred to as a rebalancing cell that includes an anode, which may be the rebalancing reactor 80 of FIG. 1, and a cathode, which may be the rebalancing reactor 82 of FIG. 1.

Figure 2:
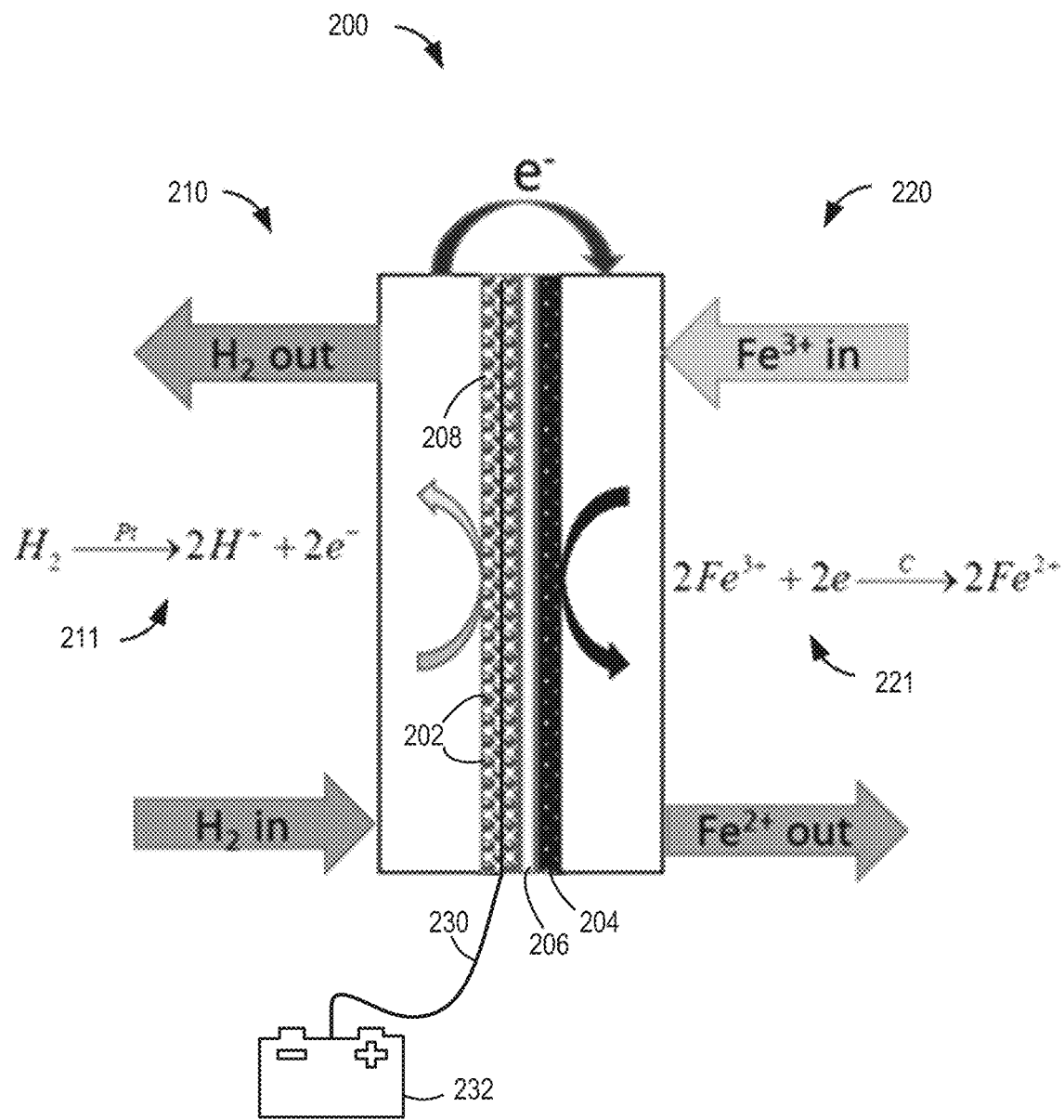
FIG. 2 shows a schematic example of a rebalancing reactor that may be coupled to the flow battery system.

A schematic diagram of a rebalancing cell 200 is depicted in FIG. 2. Hydrogen ($H_2$), evolved from the negative electrode of the IFB battery, flows through a flow field to an anodic side 210 of the rebalancing cell 200. Therein, electrons are stripped from the hydrogen molecules by a hydrogen oxidation catalyst 202, thereby producing protons and electrons, as indicated by reaction 211. The hydrogen oxidation catalyst 202 may comprise a small amount (e.g. 0.02 $mg/cm^2$ to >0.2 $mg/cm^2$) of precious metal, such as Pt, Pd, Ru, Rd or their alloys, supported on a conductive carrier, such as carbon. IFB electrolytes containing ferric ions ($Fe^{3+}$) flow through a cathodic side 220 of the rebalancing cell 200, arranged on an opposite side of a membrane separator 206 from the anodic side 210. On the cathodic side 220, electrons are accepted by ferric ions on a carbon electrode 204, thereby producing ferrous ions, as indicated by reaction 221. The hydrogen oxidation catalyst 202, acting as an anode, may be separated from the carbon electrode 204, acting as a cathode, by the membrane separator 206 which allows selective exchange of ions between the anodic side 210 and the cathodic side 220.

The rebalancing cell 200 may include a conductive wire 230 coupled to a catalyst bed 208 in which the hydrogen oxidation catalyst 202 is embedded. The conductive wire 230 may be formed of a metal such as titanium and may be inserted into the catalyst bed so that the wire is secured within the catalyst bed. The conductive wire 230 may be woven, for example, in a sinuous pattern to maximize a coverage of the conductive wire 230 across a surface area of the catalyst bed 208. A voltage is conducted by the conductive wire 230 from an electrical energy storage device 232, such as a battery. Further details of a use of the conductive wire 230 to apply a potential to a surface of the hydrogen oxidation catalyst 202 are described below with reference to FIGS. 10-11.

The resulting Gibbs free energy of reactions 211 and 221 is negative. The reactions therefore occur spontaneously, resulting in the high theoretically electrical efficiency. The energy released from these electrochemical cells may be used to power auxiliary components in the overall IFB system, for example, electronic components, cooling fans, and/or indication lights, thus improving overall system efficiency. The energy, i.e. voltage, generated through the application of an electrical load to the electrochemical cell may be stored in a system power bus.

A rebalancing cell, e.g., the rebalancing cell 200 of FIG. 2, may be included in a rebalancing reactor, such as the rebalancing reactors 80 and 82 of FIG. 1, to offset a loss of protons due to equation (3) and stabilize an electrolyte pH, thereby also suppressing the iron corrosion reaction of equation (4). In one example, the rebalancing cell may be adapted as a packed catalyst bed housing within a trickle bed reactor and hydrogen may be directed from gas head spaces of electrolyte storage chambers with respect to the gas head spaces 90 and 92 of the negative electrolyte chamber 50 and positive electrolyte chambers 52, respectively, of FIG. 1, to one or more trickled bed reactors coupled to the electrolyte storage tanks. In another example, as shown in FIGS. 3A-3C, the rebalancing cell may be configured in a jelly roll structure, which may increase an efficiency of the rebalancing reactor toward oxidizing hydrogen gas.

In FIGS. 3A-3C, an example of a catalyst bed 300 is shown. As one example, the catalyst bed 300 may include the rebalancing cell 200 shown in FIG. 2. A section of a single layer of the catalyst bed 300 is shown from a profile view in FIG. 3A, arranged in a planar orientation for clarity. The catalyst bed 300 may be formed by coating a substrate layer 304 with a catalyst layer 306. One or both sides of the substrate layer 304 may be coated with the catalyst layer 306. Coating both sides of the substrate layer 304 may increase a redox reaction rate of the catalyst bed 300 as compared to coating a single side of the substrate layer 304.

Substrate layer 304 may include a flexible and bendable substrate such as carbon cloth, carbon paper, or another type of membrane. Substrate layer 304 may be porous or non-porous, and/or permeable to hydrogen gas, hydrogen ions, and to electrolyte, such as positive electrolyte and negative electrolyte from positive electrolyte chamber 52 and negative electrolyte chamber 50 of FIG. 1. Substrate layer 304 may further be inert with respect to hydrogen gas, hydrogen ions, and the electrolyte including both the positive electrolyte and the negative electrolyte. A thickness 308 of the substrate layer 304 may be small enough so as not to substantially hinder diffusion or convective transport of electrolyte species through the substrate layer 304. For example, when the substrate layer 304 is thinner than 0.5 mm, reaction rates may be higher as compared to when the substrate layer 304 is thicker than 0.5 mm.

The substrate layer 304 may be conductive, semi-conductive, or non-conductive. Conductive substrate layers may yield higher reaction rates as compared to non-conductive substrate layers. For example, a carbon substrate (e.g., carbon cloth, carbon paper, and the like) may aid in electron transfer, and provides a catalytic surface for the ferric/ferrous ion redox reaction. Some example membrane materials that may be utilized for the substrate layer 304 include polypropylene, polyolefin, perfluoroalkoxy (PFA), polysulfone amide (PSA), and the like. In addition, the substrate layer 304 may comprise a thin ceramic sheet or a thin metal sheet, provided the substrate layer 304 does not react with ferric ions.

Catalyst layer 306 may include one or more different types of catalyst materials such as platinum, palladium, ruthenium, alloys thereof. The weight percent of the catalyst material on the substrate layer 304 may be from 0.2 wt % to greater than 0.5 wt %. The substrate layer 304 coated with the catalyst layer 306 may be porous and permeable to hydrogen gas, hydrogen ions, and to electrolyte including the positive electrolyte and the negative electrolyte. When hydrogen gas and metal ions in the electrolyte are fluidly contacted at the catalyst layer 306, the catalyst layer 306 may catalyze a redox reaction whereby the hydrogen gas may be oxidized to hydrogen ions and the metal ions may be reduced (e.g. reactions 221 and 221 of FIG. 2). The substrate layer 304 may be coated entirely with the catalyst layer 306 to increase a redox reaction rate of hydrogen gas and metal ions at the catalyst layer surface.

Catalyst bed 300 may further comprise a spacing layer 310 positioned on the catalyst layer. As shown in FIGS. 3A-3C, the spacing layer 310 may be thinner than the substrate layer 304, however in other examples, the substrate layer 304 may be thinner than the spacing layer 310. Thinner spacing layers may yield higher catalyst bed reaction rates with higher pressure drops across the catalyst bed while thicker spacing layers may yield lower reaction rates with lower pressure drops across the catalyst bed. In some examples the spacing layer 310 may be less than 1 mm thick. The spacing layer 310 may comprise a mesh, such as a plastic or other type of non-conductive mesh. For example, the spacing layer may comprise a polypropylene, polyolefin, polyethylene, polystyrene, or other polymer mesh that is stable (e.g., does not react with or degrade in the presence of) ferric/ferrous ion solutions. In other examples, the spacing layer may comprise and open-celled plastic foam or sponge material.

A conductive wire 330, which may be similar to the conductive wire 230 of FIG. 2, may be woven through the catalyst layer 306 so that the conductive wire 330 is in close proximity to the catalyst material, e.g., in contact with or near catalyst sites. The conductive wire 300 may have a linear, sinuous, zig zag, etc. layout across the z-x plane in the catalyst layer 306 and extend out of the catalyst bed 300 to couple to an electrical energy storage device 332, hereafter battery 332. A voltage supplied by the battery 332 may be conducted to the catalyst layer 306 via the conductive wire 330.

The catalyst bed 300 may be spiral wound to form a jelly roll structured catalyst bed 320, as depicted in FIGS. 3B-3C. A set of reference axes 301 are provided for comparison between views, indicating a y-axis, an x-axis, and a z-axis. As shown in FIG. 3B in a view of an end of the jelly roll structured catalyst bed 320, along an x-z plane, each successive substrate layer 304 and catalyst layer 306 of the spiral wound jelly roll structured catalyst bed 320 is separated by the spacing layer 310. The spacing layer 310 may entirely cover the catalyst layer 306. In this way, each catalyst layer 306 is entirely separated from an adjacent catalyst layer by the spacing layer 310 when the substrate layer 304 is coated on both sides by the catalyst layer 306. As shown in a perspective side view of the jelly roll structured catalyst bed in FIG. 3C, the spacing layers 310 may extend across the entire axial dimension, e.g., along the y-axis, of the jelly roll structured catalyst bed 320, as indicated by dashed lines.

When coiled into the jelly roll structure as shown in FIG. 3C, the jelly roll structured catalyst bed 320 has a cylindrical shape. The cylindrical, rolled configuration of the jelly roll structured catalyst bed 320 may allow the jelly roll structured catalyst bed 320 to be removed as a single unit, reducing time and costs of maintenance of a rebalancing reactor. Electrolyte may be flowed through the jelly roll structured catalyst bed 320, the flow in contact with the catalyst bed 320 for a prolonged period of time in comparison to packed catalyst beds, increasing an efficiency of the jelly roll structured catalyst bed 320 in facilitating hydrogen oxidation and iron reduction.

The conductive wire 330 may be incorporated into the catalyst layer 306 so that an end of the conductive wire 330 that ends of the conductive wire 330 that couple directly to the battery 332 extend out of the jelly roll structured catalyst bed 320 in an axial direction, along the y-axis as shown in FIG. 3C. The jelly roll structure catalyst bed 320 may be inserted into an outer housing that is also cylindrical to match a shape of the jelly roll structure catalyst bed 320, sliding in and out of the housing along a central axis of rotation of the cylindrical outer housing. Extension of the conductive wire 330 from a top or a bottom, with respect to the y-axis, of the jelly roll structure catalyst bed 320 allows the conductive wire 330 to be readily connected to the battery 332 through a top or a bottom of the outer housing of the jelly roll structured catalyst bed 320.

Figure 4:
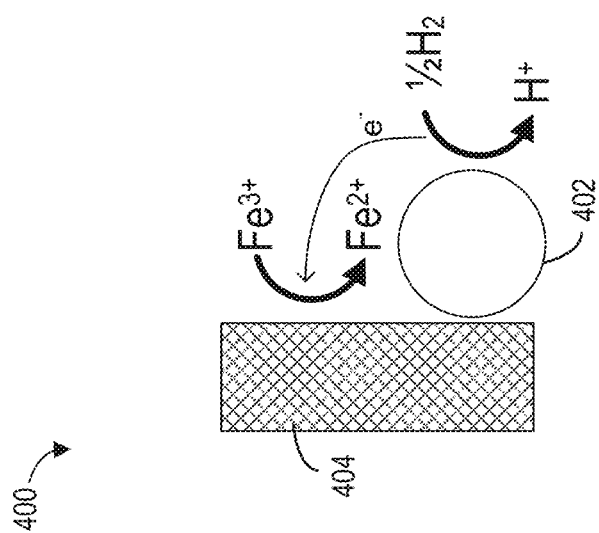
FIG. 4 shows a first example of a reaction process occurring at a rebalancing reactor catalyst.

As described above, a catalyst of a catalyst bed used in a rebalancing reactor may be a metal, such as platinum (Pt). A single catalyst site of the catalyst layer 306 is depicted in FIGS. 4 and 5 for brevity but it will be appreciated that catalyst bed may include a plurality of catalyst sites. As shown in a first scheme 400 in FIG. 4, a Pt site 402 catalyzes a transfer of an electron from half of a hydrogen gas molecule at a carbon substrate 404 to oxidize the hydrogen gas to a proton. The first reaction scheme 400 may occur at Pt sites along the catalyst layer 306 of the jelly roll structured catalyst bed 320 of FIGS. 3B-3C. The electron obtained from the hydrogen molecule is used to reduce ferric iron to ferrous iron at the carbon substrate, e.g. the substrate layer 304 of FIGS. 3A-3C, in contact with electrolyte containing iron cations.

The first scheme 400 may represent an intended process for which the rebalancing reactor is configured to perform when the electrolyte comprises exclusively redox active species such as ferric and ferrous iron complexes. However the electrolyte may include supporting, non-redox active species such as potassium cations and chloride anions from dissolved potassium chloride salt. The supporting electrolyte species may increase an ionic strength and hence a conductivity of the electrolyte. A presence of the supporting species, however, may degrade an activity of the Pt sites.

A second scheme 500 shown in FIG. 5 may occur in the rebalancing reactor when supporting electrolyte species are present, competing with and inhibiting or partially-inhibiting implementation of the first scheme 400. In the second scheme 500, chloride anions in the electrolyte may adsorb onto a Pt site 502, supported on a carbon substrate 504. Enough chloride anions may surround the Pt site to form a negatively charged layer around the Pt site. The negatively charged layer may attract cations 506, e.g., potassium cations, in the electrolyte, creating a positively charged layer around the negatively charged layer. Together, the adsorbed chloride anions and the surrounding potassium cations may form a surface charge layer and a diffuse layer, respectively, resulting in a charge double diffusion layer that inhibits or partially inhibits interaction between the intended reactants of the rebalancing reaction, such as between hydrogen gas and iron cations, and the Pt site. A presence of the charge double diffusion layer may thus degrade a performance of the catalyst bed by at least partially inhibiting contact between the intended reactants of the rebalancing reactor and the catalyst.

A performance of a catalyst bed of a rebalancing reactor may be directly affected by a concentration of supporting ionic species in an electrolyte. When a concentration of the supporting ions is lower (e.g., below a threshold concentration), the diffuse positively charged layer of the charge double diffusion layer around the Pt sites may be primarily formed from ferric and ferrous ions, allowing the iron cations to diffuse through the relatively sparse chloride surface charge layer to the Pt site. Increasing the ionic concentration, however, can result in an increase in supporting cations (e.g., potassium) that compete with the iron cations to form the double diffusion layer. When the double diffusion layer is formed predominantly by potassium cations, the ferric and ferrous ions are blocked from the Pt site by a boundary layer of positively charged potassium as well as a dense layer of chloride anions. The double diffusion layer also impedes diffusion of hydrogen gas molecules to the Pt site, thus hindering both an oxidation of hydrogen gas and a reduction of ferric iron.

Figure 6:
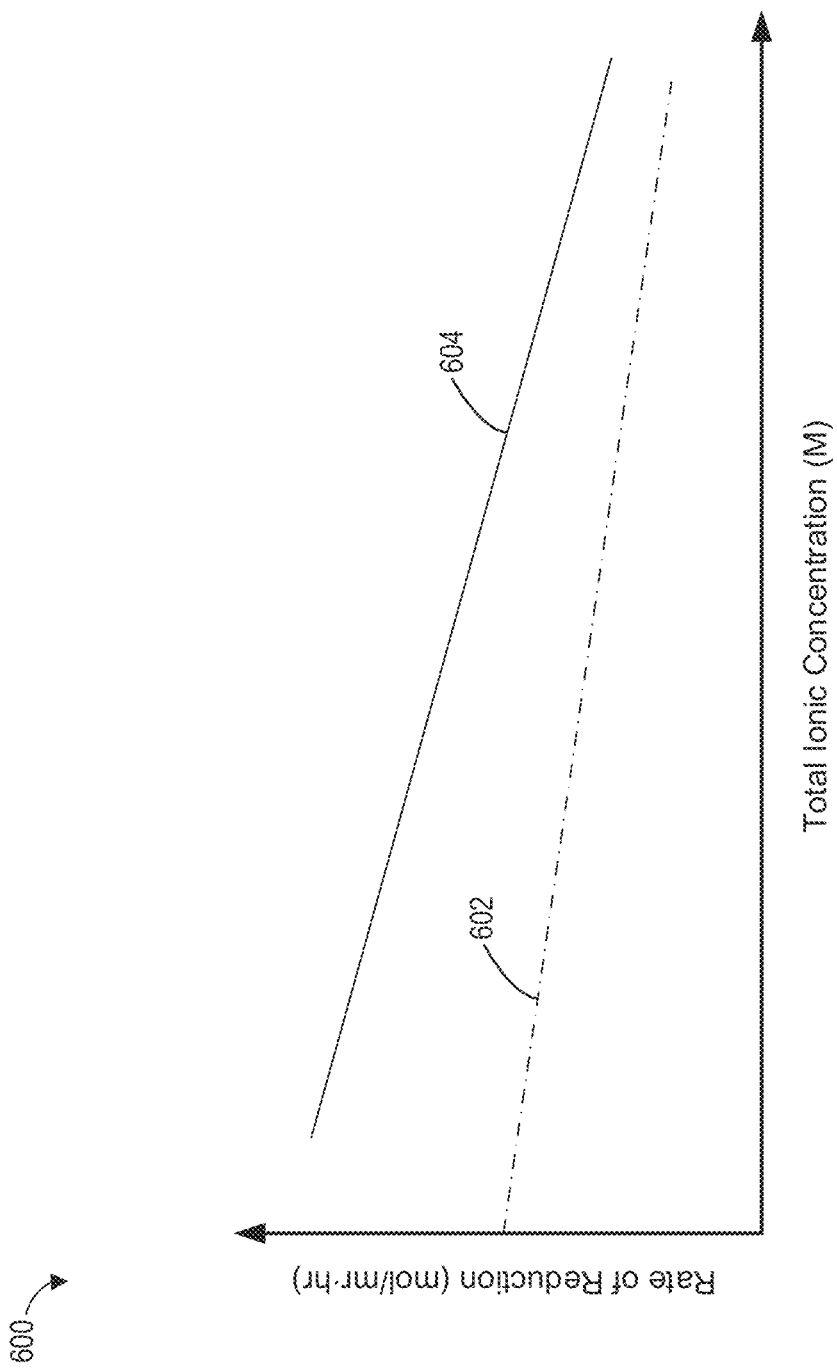
FIG. 6 shows a graph illustrating an effect of ionic concentration on a performance of the rebalancing reactor.

An effect of ionic concentration on the rebalancing reactor is shown in a graph 600 in FIG. 6. A rate of iron reduction from ferric to ferrous iron, which may be a measure of the performance of the rebalancing reactor, is plotted along the y-axis of graph 600 and total ionic concentration of the electrolyte in moles/liter (M) is plotted along the x-axis. A first plot 602 of graph 600 depicts a change in reduction rate with ionic concentration for a first Pt catalyst and a second plot 604 depicts a change in reduction rate with ionic concentration for a second Pt catalyst. The first Pt catalyst and the second Pt catalyst may be similarly used and differentiated by different carbon substrates. The second Pt catalyst may be supported on a more hydrophobic carbon support than the first Pt catalyst. Both the first and second plots 602, 604 show a decrease in ferric reduction rate as ionic concentration increases. The dependence on the total ionic concentration for is higher for the second Pt catalyst supported on the more hydrophobic carbon support.

Performance degradation of a catalyst bed in a rebalancing reactor of an IFB caused by formation of the charged diffusion double layer may be mitigated by treating the catalyst bed in a manner that counteracts adsorption of the anions at the catalyst surface. For example, such treatment may include removing adsorbed anions from catalyst sites and/or repelling anions from the catalyst sites. Effects of various catalyst bed treatments for mitigating catalyst bed degradation may be evaluated using a testing apparatus 700, as shown in a schematic diagram in FIG. 7.

The testing apparatus 700 includes an electrolyte container 702, storing electrolyte used by an IFB. The electrolyte may flow in a direction indicated by arrows 704, from the electrolyte container 702, through a peristaltic pump 706. Activation of the peristaltic pump 706 drives a movement of the electrolyte, compelling electrolyte to flow through an electrolyte circuit 708 of the testing apparatus 700. The electrolyte is pumped to an injector 710 that is coupled to a high pressure hydrogen bottle 712 containing pressurized hydrogen gas. A valve 714 is positioned between the hydrogen bottle and the injector, controlling flow of hydrogen gas to the injector. When the valve is opened, hydrogen gas is injected into the electrolyte at the injector 710. The hydrogen infused electrolyte is flowed to a rebalancing reactor 716.

In one example, the rebalancing reactor 716 may be configured with a jelly roll structured catalyst bed 718. In other examples, the rebalancing reactor 702 may have a packed catalyst or be adapted with some other catalyst configuration. The jelly roll structured catalyst bed 718 may be a coiled sheet of a carbon supported Pt catalyst on a carbon substrate layer, such as the jelly roll structured catalyst bed 320 shown in FIGS. 3B and 3C. Electrolyte may flow in a direction indicated by arrows 704 through the electrolyte circuit 708 to return to the electrolyte container 702. An ionic concentration of the electrolyte may be adjusted by varying a concentration of potassium chloride (KCl) in the electrolyte.

Figure 7:
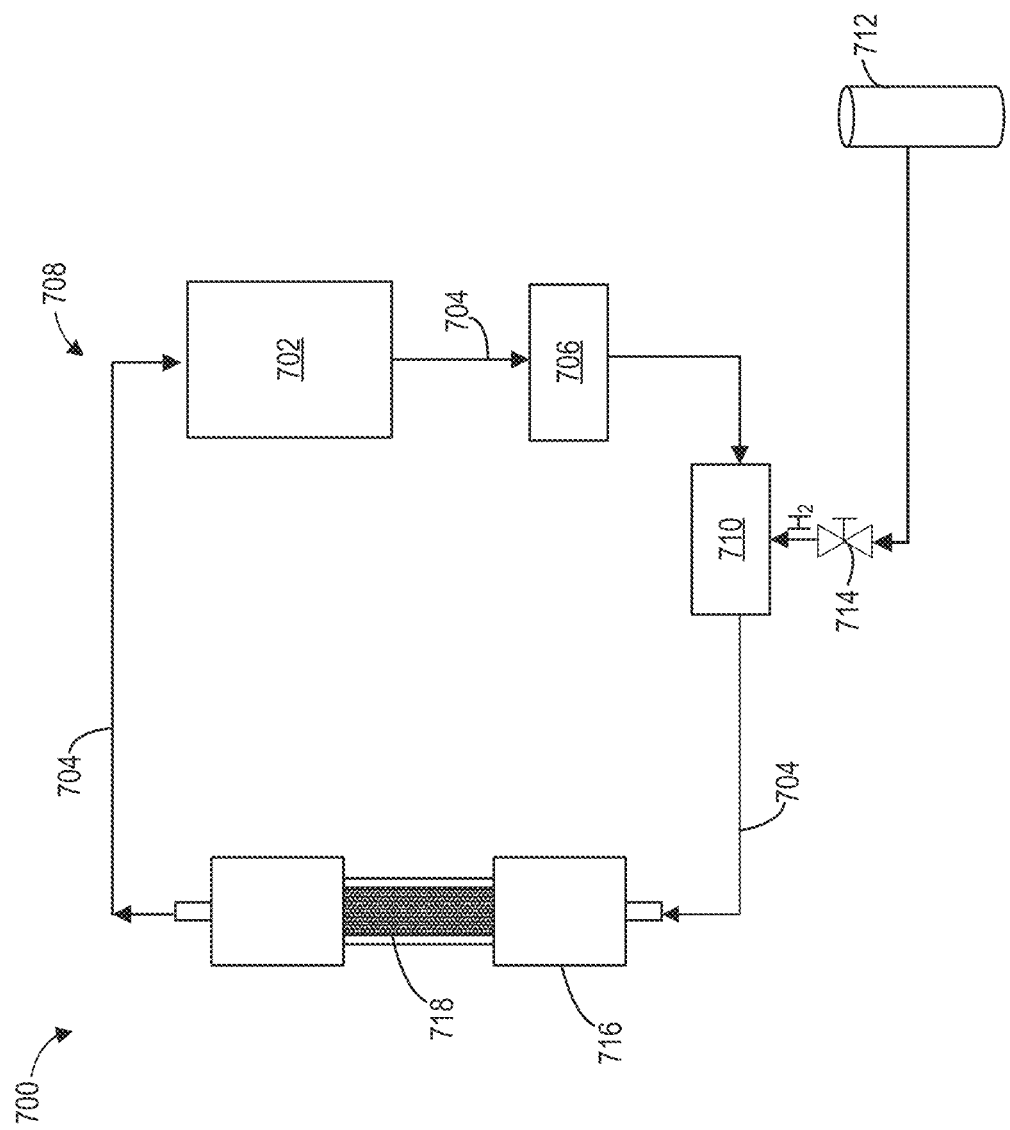
FIG. 7 shows a schematic diagram of an example of a testing apparatus for evaluating a performance of the rebalancing reactor.

Using the testing apparatus 700 of FIG. 7, effects of a first treatment applied to the rebalancing reactor 716 may be evaluated. It will be appreciated that the testing apparatus 700 of FIG. 7 is a non-limiting example and other systems may be similarly used to evaluate the rebalancing reactor. The first treatment may include soaking the jelly roll structured catalyst bed 718 (hereafter, catalyst bed 718) of the rebalancing reactor 716 in deionized (DI) water with the catalyst bed 718 unrolled. The catalyst bed 718 may be removed from an outer housing of the rebalancing reactor 716 and placed in a sealed container filled with a known amount of DI water. The sealed container may be placed in an oven and heated to a target temperature, such as 50° C., for a period of time. In other examples, the target temperature may be 70° C. or 80° C. or any temperature between room temperature and 100° C. A set of variables including the oven temperature, a volume of DI water, and the amount of time the catalyst bed 718 is heated in the oven may be independently varied to separate effects of each variable.

The catalyst bed 718 is returned to the outer housing of the rebalancing reactor 716 after removal from the DI water, rinsing with fresh DI water, and re-coiled into the jelly roll structure. The peristaltic pump 706 of the testing apparatus 700 may be activated to pump electrolyte through the electrolyte circuit 708. As the electrolyte flows through the rebalancing reactor 716, a rate of ferric iron reduction may be determined by measuring a change in ferric iron concentration in the electrolyte by cyclic voltammetry, redox titration, or oxygen reduction potential measurements.

An effect of soaking time and temperature of a catalyst bed, e.g., the catalyst bed 718 of FIG. 7 on ferric iron reduction is shown in a graph 800 in FIG. 8. A rate of ferric ion reduction, in moles per square meter hour, is measured along the y-axis and a time of soaking in DI water is shown along the x-axis of graph 800. Two sets of data are shown in graph 800: a first data set 802 (circles) representing soaking of the catalyst bed at 80° C. and a second data set 804 (diamonds) representing soaking of the catalyst bed at 90° C. An initial rate of ferric iron reduction (not shown in graph 800) may be, for example, 0.73 mol/m²hr after numerous cycles of usage of the catalyst bed in a rebalancing reactor.

The first data set 802 includes two data points at, for example, 18 hours and 78 hours of catalyst bed soaking in DI water. The longer soaking time corresponds to a higher reduction rate by 0.2 mol/m²hr. The second data set 804 includes three data points at, for example, 89, 125, and 188 hours of catalyst bed soaking, all three data points corresponding to higher reduction rates than the rates for the first data set 802. The second data set 804 also shows an increase in the rate of ferric iron reduction with longer soaking times. The increase in reduction rate between 125 and 188 hours is less than then the increase in reduction rate between 89 and 125 hours as well as less than then increase in reduction rate shown by the first data set 802.

The first data set 802 and second data set 804 displayed in graph 800 indicate that soaking the catalyst bed in warmer DI water increases the rate of ferric iron reduction. Longer soaking times also result in increased reduction rates although an effect of soaking period may taper as soaking time increase beyond 188 hours. Soaking the catalyst bed in warm DI water may effect removal of adsorbed chloride anions from a catalyst surface. The negatively charged chloride anions may experience van der Waals forces attracting the chloride anions to dipolar water molecules. Over time, the van der Waals forces may overcome adsorption of the chloride anions to the catalyst surface, thus stripping the catalyst surface of a negatively charged surface layer. In other words, maintaining a catalyst bed temperature above a threshold DI soaking temperature during DI soaking of the catalyst bed may aid in increasing the recovered performance of a degraded catalyst bed relative to lower catalyst bed temperatures. Furthermore, soaking a catalyst bed in DI water longer than a threshold amount of time may aid in increasing the recovered performance of a degraded catalyst bed relative to shorter DI soaking times. An increased recovered performance may refer to higher rebalancing reaction rates (e.g., ferric reduction rates for catalyst beds in IFB rebalancing reactors). For example, the threshold DI soaking temperature may be greater than 80° C.; in another example the threshold DI soaking temperature may be greater than 90° C. In one example, the threshold DI soaking time may be greater than 60 hours.

A number of water molecules present to interact with the catalyst bed may also affect a change in ferric iron reduction rate after soaking in DI water. For example, a volume of DI water used to soak the catalyst bed may determine an amount of chloride anions removed from the catalyst surface. An effect of DI water volume on a rate of ferric iron reduction is depicted in a graph 900 in FIG. 9. A testing apparatus, such as the testing apparatus 700 of FIG. 7 may be used to evaluate an influence of volume on a jelly roll structured catalyst bed. Data sets showing rate of ferric ion reduction, in moles per square meter hour, are displayed in columns, representing five different catalysts used in the catalyst bed.

A first data set 902 of graph 900 shows baseline reduction rates for each type of catalyst, e.g., reduction rates without soaking in DI water. The baseline reduction rates vary slightly, ranging, for example, between 0.9 and 1.1 mol/m²hr and each type of catalyst may be soaked in different volumes of DI water, ranging between 40 mL to 500 mL. A second data set 904 shows reduction rates for each type of catalyst after soaking in DI water at 90° C. for 62 hours. Comparison of the first data set 902 to the second data set 904 for each type of catalyst shows that ferric iron reduction rates increase by at least 100% for each type of catalyst after soaking, increasing by, for example, up to 3.8 times. Furthermore, greater volumes of DI water used to soak the catalyst bed may be correlated with higher increases in reduction rate due to greater availability of more water molecules to strengthen an overall van der Waals force compelling removal of chloride anions from catalyst surfaces.

Turning to FIG. 13, it illustrates a plot 1300 of the percent recovered performance of a degraded catalyst bed versus a volume of DI water used for the DI soaking treatment as applied to various catalyst bed types, each of the data points representing DI soaking of a different catalyst bed with equivalent catalyst surface area. Plot 1300 infers that recovery in performance of a degraded catalyst bed may be aided by conducting the DI soaking treatment with a ratio of DI water volume/catalyst surface area that is above a threshold ratio. In one example, a threshold ratio of DI water volume to catalyst surface area, e.g., minimum volume of DI water to achieve a maximum performance recovery, may be 10,000 mL/m², 15,000 mL/m², 20,000 mL/m² or greater for every 0.01 m² of catalyst surface area.

A first treatment process for a catalyst bed of a rebalancing reactor may include soaking the catalyst bed in DI water at a target temperature and a target period of time, as described above with respect to FIGS. 8 and 9. Soaking the rebalancing reactor may be an effective method to strip adsorbed anions from a catalyst surface, allowing hydrogen molecules to diffuse readily to reactive catalytic sites of the catalyst bed and reducing a likelihood of double diffusion layer formation. The first treatment may not, however, be conducted during operation of the rebalancing reactor (and IFB) due to removal of the catalyst bed from the rebalancing reactor in order to submerge the catalyst bed in DI water. As a result, application of the first treatment, as described above, may be delayed until a significant decrease in catalytic performance is apparent.

In an alternative embodiment of the first treatment process, the catalyst bed may be flushed with DI water instead of soaked. While flushing the catalyst bed may not occur simultaneously with active operation of the rebalancing reactor, flushing of the catalyst bed may be conducted without removing the catalyst bed from the rebalancing reactor, thereby reducing an amount of time spent treating the rebalancing reactors and reducing operational downtime thereof. For example, a redox flow battery, such as the redox flow battery 10 of FIG. 1 with at least one rebalancing reactor, e.g., the rebalancing reactors 80 and 82 of FIG. 1, may be coupled to a DI water system. Water in the DI water system may be adapted to supply DI water from a reservoir to one or more of the rebalancing reactors 80 and 82, thereby flushing DI water through the rebalancing reactor(s), including flushing the catalyst bed therein with DI water. A portion of the DI water system, such as the reservoir, may be heated upstream of the rebalancing reactor to deliver DI water heated to a desired temperature (e.g., at a temperature above the threshold DI soaking temperature) to the catalyst bed. Upon exiting the catalyst bed, the DI water containing ions released from the catalyst bed, may be collected in a waste tank for disposal or purification.

Flow of DI water from the DI water system to the catalyst bed may be controlled by a valve positioned upstream of the rebalancing reactor and actuated by a controller, such as the controller 88 of FIG. 1. The flow battery system may be configured to block flow of electrolyte to the rebalancing reactor, e.g., by closing a valve arranged in an electrolyte channel upstream of the rebalancing reactor, when the DI water system valve is commanded to open. The DI water system valve may be opened to allow water to flush the catalyst bed when a performance of the rebalancing reactor is detected to be diminished. The valve may be opened for a set period time to deliver a target volume of water to the catalyst bed based on a controlled flow rate of the DI water. The DI system may also include a valve positioned downstream of the rebalancing reactor.

In one example, the downstream valve may be closed while the upstream valve is opened to allow the rebalancing reactor to fill with DI water. The catalyst bed may soak in the DI water for a period of time determined to be sufficient to desorb ions from the catalyst bed. In one example, the period of time may correspond to a time greater than a threshold DI soaking time, as described above. The downstream valve may then be opened to drain the DI water when the period of time elapses, followed by closing of the upstream DI water system valve and re-opening of the valve upstream of the rebalancing reactor that controls electrolyte flow to the rebalancing reactor.

Alternatively, DI water may be continuously flushed through the catalyst bed, until the DI water is sufficiently low in ion concentration to deem the catalyst bed cleaned of adsorbed anions. The DI water emerging from the catalyst be may be monitored for a resistivity of the water, allowing flushing of the catalyst bed to proceed until the resistivity of the water decreases below a threshold DI soaking resistivity. In one example, the threshold DI soaking resistivity may be 18 MΩ·cm or less. Reducing the resistivity of the DI water emerging from the soaked catalyst bed below the threshold DI soaking resistivity may aid in reducing anion adsorption at the catalyst surface. By adapting the first treatment process to be performed without removal of the catalyst bed, the catalyst bed may be more efficiently restored to a desired performance with decreased downtime, e.g., deactivation, of the rebalancing reactor.

In some examples, the first treatment process may be configured either as a DI water soaking process that demands removal of a catalyst bed from a rebalancing reactor or as a purging process that flushes the catalyst bed within the rebalancing reactor with DI water. In other examples, both configurations of the first treatment process may be applied to the rebalancing system. The purging process may be used as a relatively quick and efficient method to periodically strip anions from the catalyst bed so that the rebalancing balance is deactivated for a brief period of time. The soaking process may be used as a less frequent, deep treatment of the catalyst bed to more thoroughly remove adsorbed anions from a catalyst surface.

Although configuring the first treatment process to be applied without removing the catalyst bed from the rebalancing reactor may offer a faster option for maintaining catalyst performance, flushing of the catalyst bed may nonetheless demand a deactivation of the rebalancing reactor and redox flow battery over a duration of the first treatment process. Thus an additional treatment method that may be used in situ during operation of the redox flow battery, and more specifically, an IFB, may be desirable to more routinely reduce catalytic degradation in the rebalancing reactor.

A second treatment process may also address adsorption of chloride anions onto a catalyst surface. The second treatment process may include applying a negative potential to a catalyst bed of a rebalancing reactor during operation of the rebalancing reactor. More specifically, the second treatment may be applied during charging of the IFB when hydrogen gas is generated as a side reaction. Alternatively, the second treatment may be used whenever the IFB is operated, regardless of cycle. The negative potential may be applied to the catalyst bed, structured as a jelly roll, by conductively coupling a conductive wire to the catalyst bed, as shown in FIGS. 2-3C. In one example, conductively coupling a conductive wire to the catalyst bed may include weaving a conductive wire, such as a titanium wire, inside the jelly roll (e.g, the catalyst bed 300 of FIG. 3C) and extending out through a top of the jelly roll, and applying a negative potential to the conductive wire.

The conductive wire may extend throughout an entire axial length of the catalyst bed, as shown in FIG. 3C, so that the negative potential is applied across the axial length of the catalyst bed. Furthermore, the conductive wire may be wrapped and/or woven throughout successive concentric layers of the jelly roll structure such that the negative potential is applied throughout each successive concentric layer of the jelly roll structure. In one example, the conductive wire may be conductively coupled and/or woven into one or more of the substrate layer 304, catalyst layer 306, and the spacing layer 310 prior to spiral winding the aforementioned layers to form the jelly roll structure. This may facilitate distributing the conductive wire and the negative potential more thoroughly across the catalyst bed volume, which can aid in increasing recovered performance of a degraded catalyst bed. For example, the conductive wire may be formed from titanium and woven through plastic mesh used as a substrate for preparing the jelly roll structure. In a larger jelly roll structure, two titanium wires may be woven through the plastic mesh along the entire axial length prior to rolling the jelly roll structure with the catalyst bed. By weaving the conductive wire through the plastic mesh, good contact between the catalyst and the conductive wire is enabled, allowing uniform charging of the catalyst across a surface area of the catalyst bed.

A counter electrode formed from titanium mesh, carbon electrode or graphite felt, may be placed in an electrolyte of the rebalancing reactor, the ratio of the counter electrode surface area to a surface area of a catalyst supported on the catalyst bed being less than a threshold surface area ratio. In one example, the threshold surface area ratio may be less than or equal to 0.2 (e.g., one fifth). Maintaining the ratio of the counter electrode surface area to the catalyst bed surface area less than or equal to 0.2 may aid in reducing a risk of degradation of the catalyst bed due to poisoning of catalyst sites by anions. The counter electrode may be placed in the electrolyte tank or in the electrolyte path. Since the negative potential is applied on the catalyst surface to repel anions, no current flows through the counter electrode.

Figure 10:
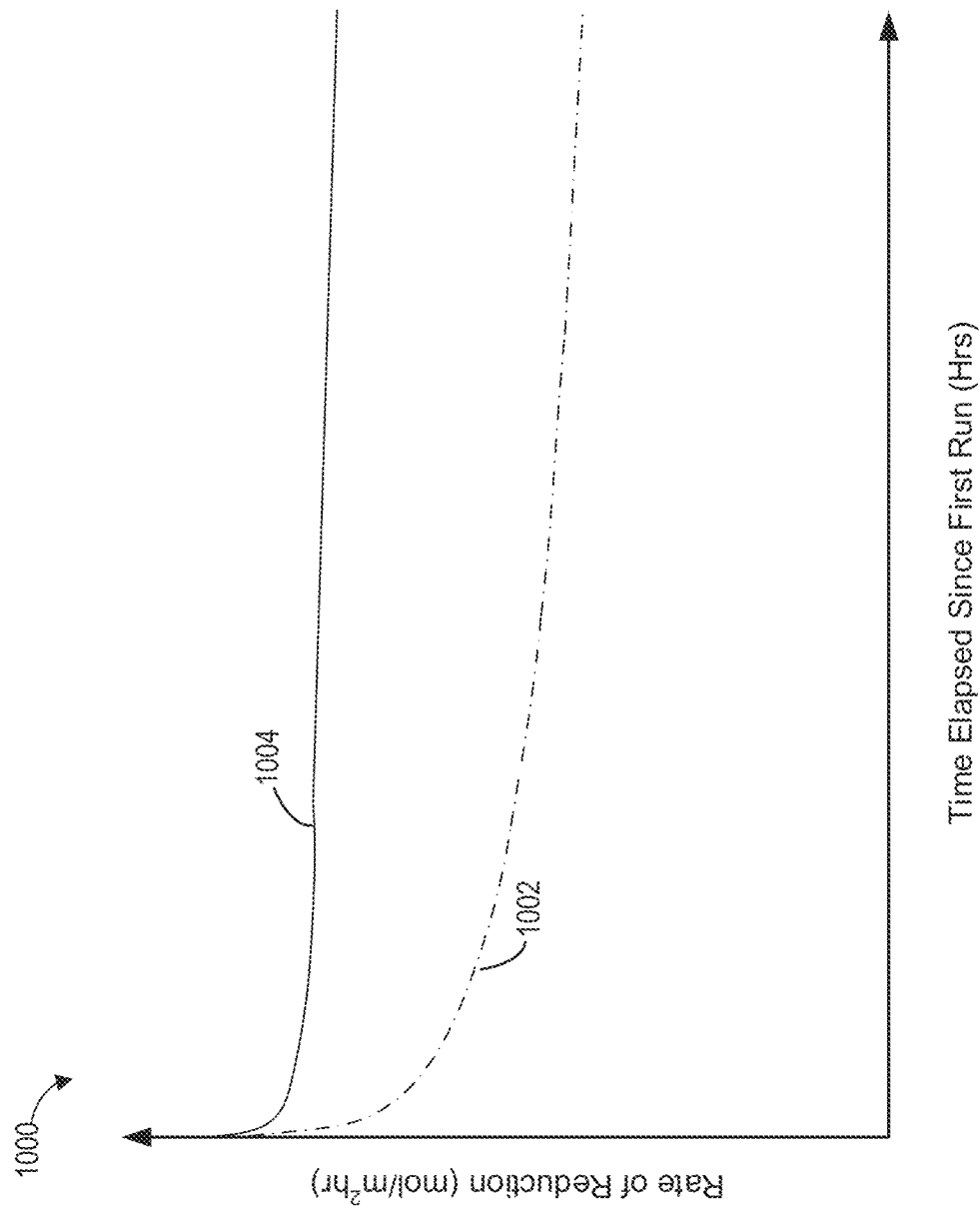
FIG. 10 shows a graph depicting a comparison of catalyst performance with and without a second treatment process applied during operation of the rebalancing reactor.

An effect of an applied potential on catalyst performance is shown in graph 1000 in FIG. 10. Graph 1000 includes a rate of ferric iron reduction at a catalyst bed of a rebalancing reactor along the y-axis, measured in moles per square meter hour, and time elapsed since initial exposure to electrolyte along the x-axis, in hours. A first plot 1002 shows a baseline trend line for a first catalyst bed in a first rebalancing reactor operated without an applied potential to the first catalyst bed. A second plot 1004 shows a trend line for a second catalyst bed in a second rebalancing reactor operated with a negative voltage above a lower threshold negative voltage applied to the second catalyst bed. In one example, the lower threshold negative voltage may be −50 mV. In another example, the lower threshold negative voltage may be −400 mV. Furthermore, the negative voltage applied to the catalyst bed may be below an upper threshold negative voltage. Applying a negative voltage to the catalyst bed less than an upper threshold voltage may reduce a risk of generating enough current to inhibit the rate of ferric ion reduction at the catalyst bed due to electrochemical oxidation of ferrous to ferric ion at the catalyst surface. In one example, the upper threshold negative voltage may be −800 mV. The first plot 1002 shows consistently lower reduction rates than the second plot 1004 during a first interval 1004 over a duration of graph 1000.

The results shown in graph 1000 indicate that application of the negative potential to the catalyst bed increases catalyst performance during application of the potential. However, when the applied potential is removed, the reduction rate may drop rapidly to the baseline rate but may be restored to a higher reduction rate when the negative potential is re-applied to the catalyst bed.

The continuous application of the negative potential to the catalyst bed in the rebalancing reactor may impose a negative charge on the catalyst bed. The negative charge may repel chloride anions, suppressing anion adsorption onto the catalyst surface and reducing a likelihood of formation of the charge double diffusion layer. During operation of the rebalancing reactor the negative potential may be continuously applied to the catalyst bed or selectively applied during charging of an IFB coupled to the rebalancing reactor. A magnitude of the negative potential may be varied when catalyst performance is determined to be degraded. For example, if a ferric iron reduction rate is detected to decrease below a threshold rate, an external electrical device providing a voltage to the conductive wire woven into the catalyst bed may be increased (e.g., a more negative potential applied) to increase a negative charge on the catalyst bed and to increase a repulsive force discouraging adsorption of anions at a surface of the catalyst bed.

The second treatment process may be routinely used during IFB operation and during rebalancing reactor operation, including continuously applying the negative potential to the catalyst bed to retard catalytic degradation resulting from adsorption of chloride anions onto the surface of the catalyst. In contrast, the first treatment process may be a supplemental treatment, whereby DI soaking or purging of the catalyst bed may be performed as an additional treatment during conditions when degradation of the catalyst reaches beyond a threshold degradation level, despite the continuous negative overpotential. For example, the threshold degradation level may be reached when a ferric iron reduction rate decays below a threshold reaction rate, indicating that the rebalancing reactor performance is degraded. In another example, the threshold degradation level may be indicated when an electrolyte pH is greater than a first threshold pH. As such, a rebalancing reactor catalyst bed may be degraded and hydrogen gas production, resulting from iron metal corrosion and proton reduction, may occur at higher rates which may consume protons and increase the electrolyte pH. In another example, the threshold degradation level may be reached when a battery charge capacity is reduced; when a rebalancing reactor catalyst bed is degraded, plating at the negative electrode of the IFB battery cell(s) may be reduced, thereby reducing battery charge capacity.

In one case, the second treatment may be used continuously when the IFB is in operation. Over numerous charging and recharging cycles, a performance of the rebalancing reactor catalyst may decrease due to formation of the charge double diffusion layer at the catalyst surface, resulting in a decrease in the ferric iron reduction rate at the rebalancing reactor. Upon detection of the decrease in the reduction rate, the first treatment process may be applied, e.g., the catalyst bed may be flushed with DI water while the rebalancing reactor is deactivated or the rebalancing reactor may be deactivated and the catalyst bed may be removed and soaked in DI water.

In another example, both of the two embodiments of the first treatment process may be used in combination with the second treatment process. For example, the second treatment may be applied continuously during IFB operation, at routine intervals of operation of the IFB, or when the ferric reduction rate drops below a first threshold rate to maintain the ferric reduction rate above the threshold rate. When the second treatment is no longer able to maintain the ferric reduction rate above the threshold, a DI flush of the first treatment process may be used to restore catalytic performance. The DI soak of the first treatment process may be used periodically when even the DI flush does not maintain catalytic performance or may be used as treatment between longer periods of operation, such as every 200 hours of IFB operation.

It will be appreciated that the examples described above are non-limiting examples of how the first and second treatment processes may be implemented. Various combinations of the methods associated with the first and second treatment processes have been contemplated. The negative potential of the second method may be a relatively low overpotential of, for example, −400 mV vs. hydrogen potential, thus readily supplied by a small battery such as a lithium ion or nickel metal hydride battery. Replacement of the battery may contribute minimally to overall system costs. Both the first and second treatment processes may be low-cost, simple and effective methods, either independently or collaboratively, to increase catalytic performance in the rebalancing reactor for an IFB. A first method 1100 for reducing performance degradation of a catalyst bed of a rebalancing reactor by generating a surface charge (e.g., the second treatment process described above) is shown in FIG. 11.

The catalyst bed of the first method 1100 may be the jelly roll structured catalyst bed 320 of FIGS. 3B-3C, configured as a stack including a layer of platinum, or another catalytic metal, supported on carbon, a layer of a carbon substrate, and a spacing layer. The catalyst bed, rolled into a coil, may be arranged in at least one rebalancing reactor coupled to a redox flow battery, with respect to the rebalancing reactors 80, 82 of the redox flow battery 10 of FIG. 1. The redox flow battery may be an all-iron flow battery (IFB), adapted with electrolyte comprising dissolved ferric and ferrous iron complexes and supporting non-redox active salts, such as KCl. The IFB may have a controller, such as the controller 88 of FIG. 1, receiving information from sensors of the IFB and rebalancing reactors, such as temperature sensors in the positive and negative electrolyte chambers, and sending instructions to actuators of the IFB, such as valves controlling flow of electrolyte. The controller may refer to instructions stored on a memory of the controller to execute commands based on data received from the sensors. A pH of the electrolyte may be acidic to maintain a stability of the electrolyte. Hydrogen gas, a by-product at a negative electrode of the IFB, may be generated and channeled to the rebalancing reactor to be oxidized by the catalyst bed to protons. Ferric iron may also be reduced to ferrous iron at the carbon substrate of the catalyst bed.

At 1102, the method includes operating the IFB. For example, pumps may be activated to pump electrolyte through a cell of the IFB, the cell including positive and negative electrode compartments. The IFB may undergo either charging, implementing equations (1) and (2) in a forward direction, or discharging, during which equations (1) and (2) occur in a reverse direction. When the IFB is actively charging, side reactions such as proton reduction and iron corrosion, according to equations (3) and (4), may result in a rise in a pH of the electrolyte and a loss of electrolyte stability.

At 1104, the method includes applying a negative potential to the catalyst bed. The negative potential, which may be in a range between −400 to −600 mV, may be applied to the catalyst bed of the rebalancing reactor by a conductive wire woven into the catalyst bed, such as a titanium wire, coupled to an electrical device that supplies electrical power. For example, the electrical device may be a lithium ion battery or a nickel metal hydride battery. The battery may be connected to the conductive wire by a switch upon determination that the electrolyte pH surpasses the first threshold. Alternatively, the battery may be continuously coupled to the wire and the negative potential applied to the catalyst bed constantly, regardless of IFB operating mode or active flow of electrolyte through the rebalancing reactor. A counter electrode may be arranged in the electrolyte. Application of the overpotential to the catalyst bed may impose a negative charge on the catalyst bed, repelling anions in the electrolyte that may otherwise adsorb to the catalyst surface.

The method proceeds to 1106 to determine if the pH rises above a first threshold. The first threshold may be a pH, such as pH 4, above which a likelihood of iron oxide formation increases, where precipitation of iron oxide may lead to loss of iron cations available for redox activity. The pH may be measured by a pH meter that sends electrolyte pH information to the controller. If the pH is not above the first threshold, the method proceeds to 1108 to continue operating the IFB under current conditions, such as in the charging or discharging mode. The method then returns to the start. However, if the pH is measured to be above the first threshold, the method proceeds to 1110.

At 1110, the method includes decreasing the pH of the electrolyte. Decreasing the electrolyte pH includes flowing electrolyte from the IFB to the rebalancing reactor at 1112. A valve arranged in a line between an electrolyte storage tank of the IFB and the rebalancing reactor may be opened to allow electrolyte to flow from the electrolyte storage tank to the rebalancing reactor. Adjusting the electrolyte pH also includes channeling hydrogen gas from the electrolyte storage tanks to the rebalancing reactor at 1114. Hydrogen gas produced by equations (3) and (4) may accumulate in the electrolyte storage tanks and be siphoned to the rebalancing reactor. As hydrogen gas and electrolyte flows into the rebalancing reactor, the hydrogen gas diffuses to the catalyst surface and may be oxidized to generate protons. Simultaneously, ferric iron may be reduced to ferrous ion. The electrolyte, containing elevated concentrations of protons and ferrous ion, is recirculated to the cell of the IFB at 1116 to rebalance the pH and iron speciation of the electrolyte in the cell.

At 1118, the method determines if the ferric iron reduction rate in the rebalancing reactor is above a second threshold. The ferric iron reduction rate may be measured by cyclic voltammetry, redox titration, or an oxygen reduction potential meter. The second threshold may be a rate of reduction that is sufficiently slow to indicate that catalyst performance is degraded to a degree where electrolyte instability and pH rise is imminent. For example, the second threshold may be set at 0.6 mol/m$^2$hr. If the reduction rate is determined to not fall below the first threshold, the method returns to 1104 to evaluate whether the electrolyte pH is rising above the first threshold.

If the iron reduction rate is determined to decay below the second threshold, the method proceeds to 1120 to flush the catalyst bed with DI water flow. Flowing DI water to the rebalancing reactor to flush the catalyst bed may include commanding a first valve arranged upstream of the rebalancing reactor in an electrolyte channel to close. The first valve in the electrolyte channel may be positioned between the IFB cell and the rebalancing reactor, controlling flow of electrolyte and hydrogen gas from the IFB cell to the rebalancing reactor. Upon closing the first valve in the electrolyte channel, a second valve in the DI water system may be commanded to open. The second valve may be arranged in a DI water channel flowing DI water from a heated reservoir of DI water to the rebalancing reactor. In some examples, the DI water system may include a third valve arranged downstream of the rebalancing reactor. The third valve may be instructed to close during the DI water flush to retain DI water in the catalyst bed to allow the catalyst bed to soak in a volume of DI before the DI water is purged from the rebalancing reactor. Alternatively, the third valve may be commanded to open during flow of DI water through the rebalancing reactor.

As the catalyst bed is exposed to DI water, anions adsorbed onto the catalyst surface may be stripped off and flushed out of the rebalancing reactor. At 1122, the method determines if a resistivity of the DI water exiting the rebalancing reactor is at a resistivity equal to or greater than a third threshold. The resistivity of the DI water after flushing the catalyst bed may be measured by, for example, a resistivity probe in the DI water system, to infer an ionic concentration in the water. The third threshold may be a resistivity that indicates that the water leaving the rebalancing reactor is no longer stripping ions from the catalyst bed due to a complete removal of ions from the catalyst bed. The third threshold may be a resistivity similar to that of pure DI water, such as 18 MΩ·cm. If the resistivity of the exiting water is not at the third threshold, the method returns to 1120 to continue flowing DI water from the reservoir through the rebalancing reactor.

If the resistivity of the water reaches or surpasses the third threshold, the method proceeds to 1124 to close the second valve of the DI water system, halting flow of DI water to the rebalancing reactor. The first valve is instructed to open, directing electrolyte from the IFB cell to the rebalancing reactor. As charging of the IFB is conducted, hydrogen gas generated at the negative electrode may be siphoned to the rebalancing reactor to be oxidized. The electrolyte is circulated from the rebalancing reactor to the battery cell after treatment at the catalyst bed. Method 1100 then continues to method 1200 of FIG. 12.

In other examples, the third threshold may instead be a target interval of time or predetermined volume of water rather than the resistivity of the outflowing water. For example, the third valve may be closed, allowing the rebalancing reactor to fill with DI water. When the rebalancing reactor is filled, a timer may be activated, set at a period of time estimated sufficient to remove anions from the catalyst surface. Alternatively, the catalyst bed may be flushed with a volume of water calculated to be a suitable volume of water to flush anions off the catalyst surface and restore a desired performance of the catalyst.

At 1202 of method 1200, the method includes determining if an operation interval, e.g., number of hours of operation, of the IFB has reached a fourth threshold. The fourth threshold may be a duration of time over which the IFB has been consistently in operation, such as 100 hours or 200 hours. The interval of time defined by the fourth threshold may be a period of elapsed operation time calculated or estimated to lead to an elevated likelihood of double diffusion formation at the catalyst surface and a decrease in performance of the rebalancing reactor. If the operation interval has not reached the fourth threshold, the method proceeds to 1204 to continue operation of the IFB, e.g., charge mode or discharge mode, while circulating electrolyte through the rebalancing reactor.

If the operation interval reaches the fourth threshold, the method continues to 1206 to halt flow of electrolyte and hydrogen gas to the rebalancing reactor. Blocking flow of electrolyte and hydrogen gas to the rebalancing reactor may be achieved by closing the first valve of the electrolyte channel. The method may proceed to 1206 regardless of whether indications of performance degradation are received, e.g., whether or not the first through third thresholds are exceeded. A request for treatment of the catalyst bed by soaking in DI water is indicated by the controller at 1208. The request may be indicated by activating an alert signal, such as a light or an alarm, to inform an operator that treatment of the catalyst bed is demanded. The request for soaking the catalyst bed may be a remedial treatment or an anticipatory treatment, depending on a status of the catalyst. Soaking the catalyst bed may include removal of the catalyst bed from the rebalancing reactor and submerging the catalyst bed in a known volume of water at a set temperature over a target period of time.

When the operator reinstalls the catalyst bed and indicates that the rebalancing reactor is ready for operation, e.g., by entering a command in a communication device of the controller or by pressing a button to deactivate the alarm, etc., the method proceeds to 1210 to resume circulating electrolyte and siphoning hydrogen gas to the rebalancing reactor. The method then returns to the start of method 1100 of FIG. 11.

The soaking of the catalyst bed in DI, at a target temperature, duration, and volume, may afford a more thorough removal of anions from the catalyst surface than the DI flushing process described above. When the catalyst bed is removed from the rebalancing reactor and soaked externally, the catalyst bed may be unrolled, thereby allowing a greater surface area of the catalyst bed to be in direct contact with a larger volume of DI water than flushing the catalyst bed while still coiled in the rebalancing reactor. Furthermore, the catalyst bed may be more efficiently and uniformly exposed to water heated to a higher temperature in an oven, when the catalyst bed is removed and unrolled, than may be achieved by heating the reservoir of DI water in the DI water system coupled to the rebalancing reactor prior to delivering the DI water to the rebalancing reactor. Thus the DI soaking process may be a more effective method to thoroughly remove anions from the catalyst surface with a caveat of demanding more time and effort to conduct. It may therefore be desirable to apply the DI soaking process less frequently than the DI flushing of the rebalancing reactor.

In this way, a pH of a flow battery electrolyte may be maintained, thereby allowing the electrolyte of the flow battery to be balanced, with regards to state of charge and concentrations of redox active species, for a prolonged period of redox flow battery operation. The redox flow battery may be an all-iron flow battery (IFB) relying on iron redox reactions to induce electron flow through battery. Competing side reactions at a negative electrode of the IFB during charging may result in consumption of protons, driving a rise in electrolyte pH and leading to electrolyte imbalance. Coupling the IFB to a rebalancing reactor where the generating hydrogen may be oxidized back to form protons while reducing ferric iron to ferrous iron may restore the electrolyte balance. However, a catalyst of the rebalancing reactor may be prone to adsorption of anions, such as chloride, derived from supporting salts in the electrolyte, and leading to formation of a double diffusion layer around catalyst sites. The double diffusion layer may impede interaction between hydrogen gas molecules and the catalyst and degrade catalyst performance in a manner that leads to progressive degradation over prolonged battery usage. The formation of the double diffusion layer may be circumvented by a applying a constant negative potential to the catalyst bed, e.g., the second treatment process described above. The negative potential imposes a negative charge on the catalyst bed, thereby repelling anions from the catalyst surface and suppressing formation of the double diffusion layer. Over time, however, ions may nonetheless become adsorbed onto the catalyst surface. Deionized water may be used to remove the double diffusion layer by exposing the catalyst to heated deionized (DI) water. The catalyst bed may either be flushed with DI water while housed in the rebalancing reactor or removed from a housing of the rebalancing reactor and soaked in DI water. Exposing the catalyst bed to DI water may strip away anions from the catalyst surface, thus reestablishing catalyst activity. Both applying a negative potential to the catalyst bed and removing anions via DI water may be cost efficient, simple methods to maintain and/or increase catalyst performance, thereby providing a continuous, in situ treatment protocol in combination with a more thorough, periodic treatment routine.

The technical effect of treating a rebalancing reactor with the first treatment process of soaking the catalyst bed in DI water in between usage of the IFB and/or the second treatment process of applying a constant negative potential to the catalyst bed during operation of the IFB is that the pH of the electrolyte is maintained, prolonging a useful lifetime of the IFB.

In one embodiment, a method includes flowing an electrolyte of the flow battery and hydrogen gas generated in the flow battery to the rebalancing reactor, applying a negative potential to a catalyst bed of the rebalancing reactor while flowing the electrolyte, detecting a decrease in a ferric iron reduction rate at the catalyst bed below a threshold rate, flowing deionized water instead of electrolyte across the catalyst bed in response to the decrease in the ferric iron reduction rate; and indicating, after a threshold interval of rebalancing reactor operating time elapses, a request for soaking of the catalyst bed in deionized water. In a first example of the method, applying the negative potential to the catalyst bed includes coupling a conductive wire to the catalyst bed, and transmitting a voltage from an electric device to the catalyst bed. A second example of the method optionally includes the first example, and further includes, wherein applying the negative potential to the catalyst bed includes generating a negative charge on the catalyst bed, the negative charge repelling electrolyte anions from the catalyst bed, and maintaining the negative potential above a threshold potential during operation of the rebalancing reactor. A third example of the method optionally includes one or more of the first and second examples, and further includes, wherein generating the negative charge on the catalyst bed includes maintaining the negative charge on the catalyst bed while the redox flow battery is charging A fourth example of the method optionally includes one or more of the first through third examples, and further includes, wherein flowing the deionized water across the catalyst bed includes halting flow of electrolyte and hydrogen gas to the rebalancing reactor and wherein halting flow of electrolyte to the rebalancing reactor includes closing a first set of valves controlling flow between the battery cell and the rebalancing reactor. A fifth example of the method optionally includes one or more of the first through fourth examples, and further includes, wherein flowing deionized water across the catalyst bed includes opening a second set of valves controlling flow between a deionized water reservoir and the rebalancing reactor, the deionized water reservoir fluidly coupled to the rebalancing reactor. A sixth example of the method optionally includes one or more of the first through fifth examples, and further includes, wherein soaking the catalyst bed includes halting flow of electrolyte to the rebalancing reactor by closing the first set of valves, removing the catalyst bed from the rebalancing reactor, and submerging the catalyst bed in heated deionized water for a predetermined period of time in a predetermined volume of deionized water. A seventh example of the method optionally includes one or more of the first through sixth examples, and further includes, wherein flowing deionized water across the catalyst bed flushes the catalyst bed and wherein the flushing terminates when the deionized water emerging from the rebalancing reactor reaches a target resistivity.

In another embodiment, a system includes, an electrolyte circulating through a cell of the redox flow battery and hydrogen gas stored in electrolyte chambers of the redox flow battery, both the electrolyte and hydrogen gas flowed to a rebalancing reactor coupled to the cell, a negative potential applied to the catalyst bed during charging of the redox flow battery, a controller, configured with computer readable instructions stored on non-transitory memory, the instructions executable by the controller to apply a negative potential to the catalyst bed during charging of the redox flow battery, flush the catalyst bed with deionized water upon detection of the rate of ferric iron reduction at the rebalancing reactor falling below a second threshold, and indicate a request for soaking of the catalyst bed in deionized water when an interval of operating time of the redox flow battery is elapsed. In a first example of the system, the electrolyte includes ferric and ferrous iron complexes, non-redox active salts, and an acid. A second example of the system optionally includes the first example, and further includes, where the hydrogen gas is generated at a negative electrode of the cell in a process that consumes protons from the electrolyte. A third example of the system optionally includes one or more of the first and second examples, and further includes, wherein the catalyst bed of the rebalancing reactor has a jelly roll structure. A fourth example of the system optionally includes one or more of the first through third examples, and further includes, wherein the negative potential applied to the catalyst bed is configured to generate a negative charge at the catalyst bed and wherein the negative potential is applied continuously during operation of the redox flow battery. A fifth example of the system optionally includes one or more of the first through fourth examples, and further includes, wherein the catalyst bed is flushed with deionized water while housed in the rebalancing reactor when deionized water is flowed through the rebalancing reactor. A sixth example of the system optionally includes one or more of the first through fifth examples, and further includes, wherein the catalyst is soaked when the redox flow battery system is deactivated and the catalyst is removed from the rebalancing reactor.

In yet another embodiment, a method includes flowing an electrolyte of the flow battery and hydrogen gas generated in the flow battery to the rebalancing reactor, detecting a decrease in an iron reduction rate of the rebalancing reactor, and responsive to the decrease in iron reduction rate, halting flow of electrolyte and hydrogen gas to the rebalancing reactor and flowing deionized water through the rebalancing reactor. In a first example of the method, detecting the decrease in the iron reduction rate of the rebalancing reactor includes measuring the iron reduction rate to be below a threshold rate that decreases a performance of the rebalancing reactor. A second example of the method optionally includes the first example, and further includes, wherein flowing deionized water includes directing deionized water from a reservoir to the rebalancing reactor. A third example of the method optionally includes one or more of the first and second examples, and further includes maintaining a negative charge on a catalyst bed of the rebalancing reactor during operation of the flow battery. A fourth example of the method optionally includes one or more of the first through third examples, and further includes, wherein flowing the electrolyte to the rebalancing reactor includes delivering the electrolyte from a battery cell of the redox flow battery to the rebalancing reactor and wherein the rebalancing reactor is configured to restore a pH and ferrous iron concentration of the electrolyte.

In another representation, a method for treating a rebalancing reactor of a redox flow battery includes flowing an electrolyte of the redox flow battery and hydrogen gas generated in the flow battery to the rebalancing reactor, and applying a negative potential to a catalyst bed of the rebalancing reactor while flowing the electrolyte and hydrogen gas to the rebalancing reactor. In a first example of the method, flowing the electrolyte to the rebalancing reactor includes delivering the electrolyte from a battery cell of the redox flow battery to the rebalancing reactor to restore a pH and ferrous iron concentration of the electrolyte. A second example of the method optionally includes the first example, and further includes, wherein applying the negative potential to the catalyst bed includes continuously maintaining the negative potential to repel anions. A third example of the method optionally includes one or more of the first and second examples, and further includes, wherein applying the negative potential to the catalyst bed includes activating an electric device electrically coupled to the catalyst bed by a conductive wire. A fourth example of the method optionally includes one or more of the first through third examples, and further includes, wherein applying the negative potential to the catalyst bed includes impeding formation of a double diffusion layer at the catalyst bed and increasing a ferrous iron reduction rate.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A redox flow battery system, comprising:
a cell receiving electrolyte and hydrogen gas;
a rebalancing reactor fluidly coupled to the cell and configured to also receive the electrolyte and the hydrogen gas; and
a conductive wire embedded in a catalyst bed of the rebalancing reactor, the conductive wire configured to apply a negative potential to the catalyst bed to impede formation of a double diffusion layer and increase a ferrous iron reduction rate at the catalyst bed.

2. The redox flow battery system of claim 1, wherein the catalyst bed is formed of a substrate layer coated with at least one catalyst layer and a spacing layer arranged over the at least one catalyst layer and wherein the catalyst bed is coiled into a cylindrical shape.

3. The redox flow battery system of claim 2, wherein the conductive wire is woven in the catalyst layer along a plane of the catalyst layer and wherein the conductive wire is connected to an electrical storage device enabling generation of the negative potential.

4. The redox flow battery system of claim 1, wherein ends of the conductive wire extend out of the catalyst bed, the catalyst bed comprising a jelly roll structure.

5. The redox flow battery system of claim 4, wherein the conductive wire is coupled to a battery.

6. The redox flow battery system of claim 1, further comprising a controller with computer-readable instructions stored on non-transitory that when executed enable the controller to supply a voltage to the conductive wire in response to the ferric iron reduction rate decreasing below a threshold rate.

7. A system for a redox flow battery, comprising:
a rebalancing cell configured to receive electrolyte and hydrogen;
a catalyst bed arranged in the rebalancing cell;
a conductive wire coupled to the catalyst bed and to a battery external to the rebalancing cell; and
a controller with computer-readable instructions stored on non-transitory that when executed enable the controller to supply a voltage to the conductive wire in response to a ferric iron reduction rate decreasing below a threshold rate.

8. The system of claim 7, wherein the instructions further enable the controller to flow deionized water to the rebalancing cell in response to the ferric iron reduction rate decreasing below the threshold rate.

9. The system of claim 7, wherein the instructions further enable the controller to soak the catalyst bed in deionized water following a threshold interval of operating the rebalancing cell.

10. The system of claim 7, wherein the catalyst bed further comprises an anode embedded therein, wherein the anode is separate from a cathode via a membrane separator.

11. The system of claim 7, wherein the conductive wire is woven into a spacing layer of the catalyst bed.

12. The system of claim 7, wherein the conductive wire is arranged between a spacing layer and a catalyst layer of the catalyst bed.

13. The system of claim 7, wherein the instructions further comprise soaking the catalyst bed with deionized water based on a ratio greater than a threshold ratio, the threshold ratio based on a comparison of a deionized water volume to a catalyst surface area.

14. The system of claim 13, wherein the ratio is greater than 10,000 mL/m$^2$.

15. The system of claim 13, wherein the ratio is greater than or equal to 20,000 mL/m$^2$.

* * * * *